(12) United States Patent
Koike

(10) Patent No.: US 7,110,189 B2
(45) Date of Patent: Sep. 19, 2006

(54) PHOTOGRAPHING LENS HAVING THREE LENS ELEMENT

(75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/087,813

(22) Filed: Mar. 24, 2005

(65) Prior Publication Data

US 2005/0219716 A1    Oct. 6, 2005

(30) Foreign Application Priority Data

Mar. 24, 2004 (JP) ............................ 2004-087883
Mar. 24, 2004 (JP) ............................ 2004-087884
Jul. 7, 2004 (JP) ............................ 2004-201039

(51) Int. Cl.
*G02B 13/18* (2006.01)
*G02B 9/12* (2006.01)

(52) U.S. Cl. .................. 359/716; 359/784; 359/791

(58) Field of Classification Search ................ 359/716, 359/784, 791
See application file for complete search history.

(56) References Cited

U.S. PATENT DOCUMENTS 5,305,148 A * 4/1994 Ikemori et al. ............. 359/689
5,606,461 A 2/1997 Ohshita
5,754,347 A 5/1998 Kobayashi
6,775,072 B1 8/2004 Sato
6,970,306 B1 * 11/2005 Matsuo ........................ 359/716
2004/0246598 A1 * 12/2004 Amanai ....................... 359/784

FOREIGN PATENT DOCUMENTS

| JP | 7-35972 | 2/1995 |
| JP | 8-220430 | 8/1996 |
| JP | 2003-149545 | 5/2003 |

\* cited by examiner

*Primary Examiner*—Scott J. Sugarman
(74) *Attorney, Agent, or Firm*—Young & Thompson

(57) ABSTRACT

A photographing lens includes first, second and third lens elements arranged in a sequence from an object side. The first lens element is a positive meniscus with a positive power, and has a convex surface convex to the object side. One of surfaces of the first lens element is aspherical. The second lens element is a positive meniscus with a positive power. The third lens element is a negative meniscus with a negative power, and has a concave surface oriented to the object side. The first, second and third lens elements satisfy conditions of:

$0.49 < |F2/F3| < 1.0$, and $0.5 < F23/F < 4$ where $F$ is a lens system composite focal length;
$F2$ is a focal length of the second lens element;
$F3$ is a focal length of the third lens element; and
$F23$ is a composite focal length of the second and third lens elements.

23 Claims, 29 Drawing Sheets

SPHERICAL ABERRATION

CURVATURE OF FIELD

DISTORTION

SPHERICAL ABERRATION

CURVATURE OF FIELD

DISTORTION

SPHERICAL ABERRATION

FOCUS (MILLIMETERS)

CURVATURE OF FIELD
ANGLE [deg]

FOCUS (MILLIMETERS)

DISTORTION
ANGLE [deg]

%

SPHERICAL ABERRATION

FOCUS (MILLIMETERS)

CURVATURE OF FIELD
ANGLE [deg]

FOCUS (MILLIMETERS)

DISTORTION
ANGLE [deg]

%

SPHERICAL ABERRATION

CURVATURE OF FIELD

DISTORTION

SPHERICAL ABERRATION

CURVATURE OF FIELD

DISTORTION

SPHERICAL ABERRATION

CURVATURE OF FIELD

DISTORTION

SPHERICAL ABERRATION

ASTIGMATISM

DISTORTION

SPHERICAL ABERRATION

ASTIGMATISM

DISTORTION

SPHERICAL ABERRATION

FOCUS (MILLIMETERS)

ASTIGMATISM
ANGLE [deg]

FOCUS (MILLIMETERS)

DISTORTION
ANGLE [deg]

%

SPHERICAL ABERRATION

ASTIGMATISM

DISTORTION

SPHERICAL ABERRATION

ASTIGMATISM

DISTORTION

SPHERICAL ABERRATION

ASTIGMATISM
ANGLE [deg]

DISTORTION
ANGLE [deg]

SPHERICAL ABERRATION

ASTIGMATISM

DISTORTION

SPHERICAL ABERRATION

ASTIGMATISM
ANGLE [deg]

DISTORTION
ANGLE [deg]

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION

ASTIGMATISM
ANGLE [deg]

DISTORTION
ANGLE [deg]

SPHERICAL ABERRATION

ASTIGMATISM

DISTORTION

SPHERICAL ABERRATION

ASTIGMATISM
ANGLE [deg]

DISTORTION
ANGLE [deg]

FIG.43
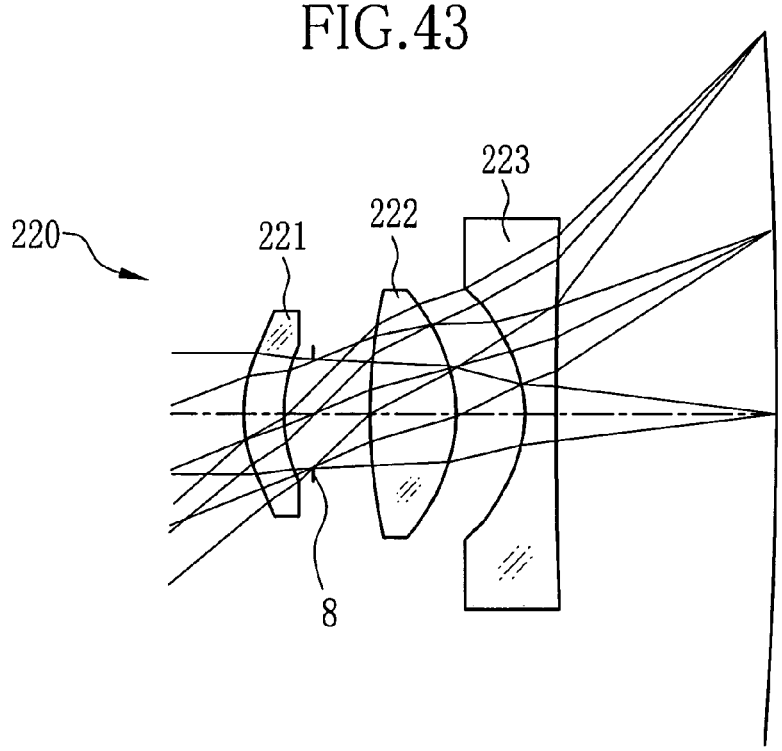
FIG.44A
SPHERICAL ABERRATION
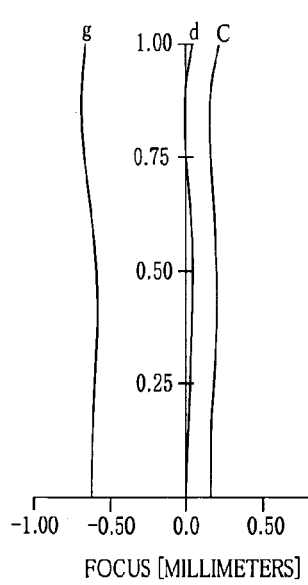
FIG.44B
ASTIGMATISM
ANGLE [deg]
FIG.44C
DISTORTION
ANGLE [deg]
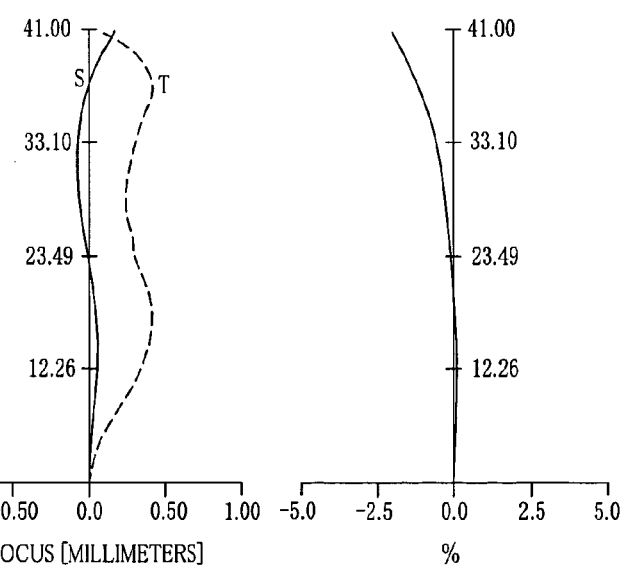

SPHERICAL ABERRATION

ASTIGMATISM

DISTORTION

SPHERICAL ABERRATION

FOCUS [MILLIMETERS]

ASTIGMATISM

ANGLE [deg]

FOCUS [MILLIMETERS]

DISTORTION

ANGLE [deg]

%

SPHERICAL ABERRATION

ASTIGMATISM

DISTORTION

SPHERICAL ABERRATION

CURVATURE OF FIELD

DISTORTION

FIG.53
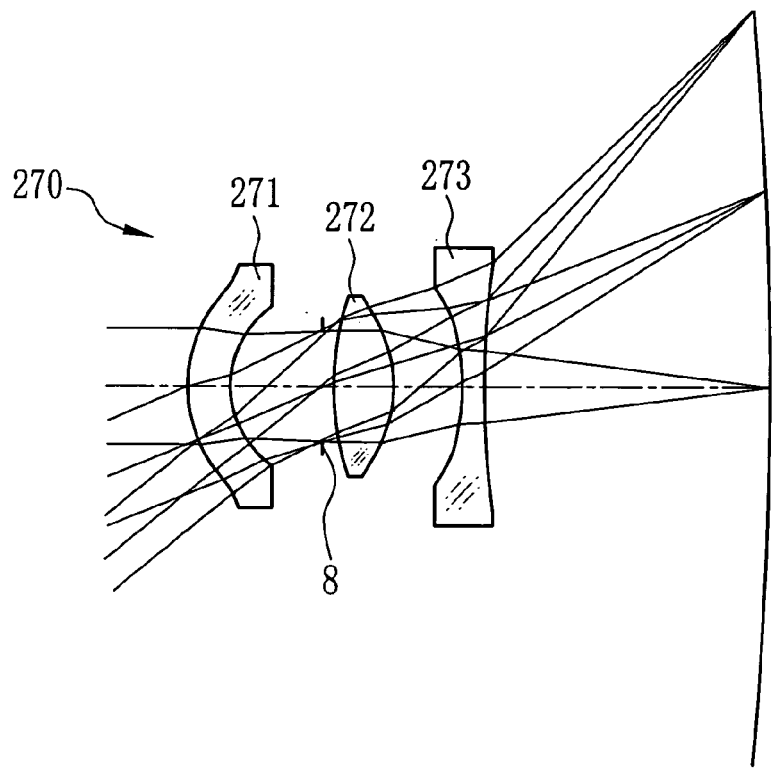
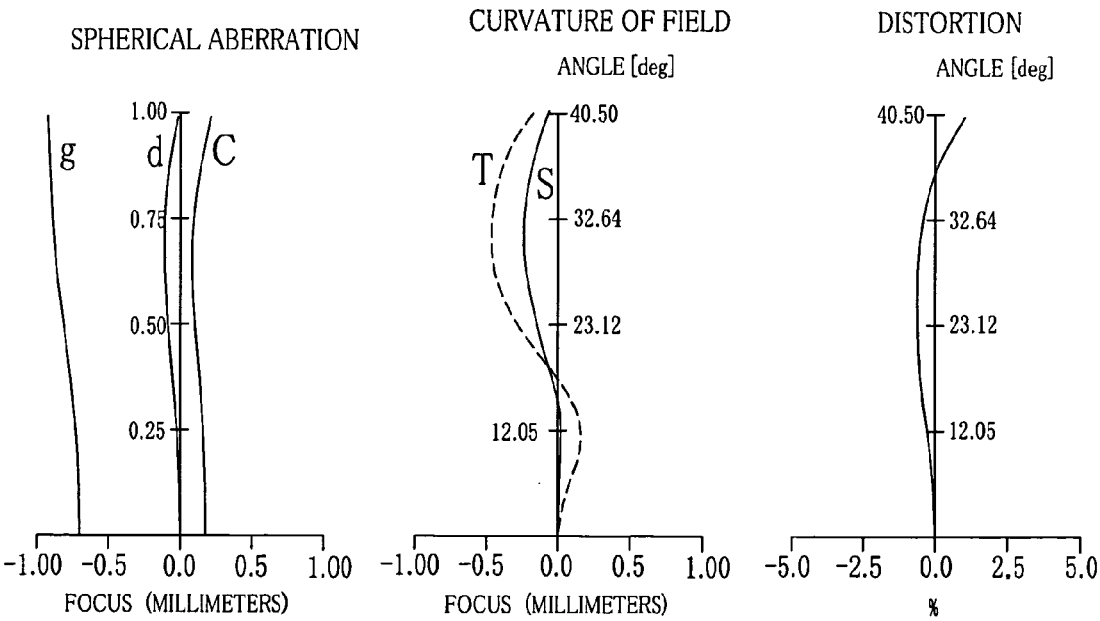
FIG.54A — SPHERICAL ABERRATION
FIG.54B — CURVATURE OF FIELD
FIG.54C — DISTORTION

SPHERICAL ABERRATION

CURVATURE OF FIELD

DISTORTION

SPHERICAL ABERRATION

CURVATURE OF FIELD

DISTORTION

PHOTOGRAPHING LENS HAVING THREE LENS ELEMENT

BACKGROUND OF THE INVENTION

1. Field of the Invention

The present invention relates to a photographing lens having three lens elements, and more particularly, a photographing lens having three lens elements, suitable for low-cost cameras such as a compact camera and photo film package, and also capable of having a comparatively great angle of view.

2. Description Related to the Prior Art

A lens-fitted photo film unit is known as a product pre-loaded with unexposed photo film, and usable for taking a photograph immediately after purchase. Examples of lens-fitted photo film units include a high-sensitivity type loaded with ISO 1600 photo film, and clear lens-aperture type provided with a photographing lens with an aperture of f/6.2. Also, portable electronic devices for photographing an image have been recently used more and more widely, such as a digital camera, camera-equipped cellular telephone and the like. As scenes to be photographed have become varied considerably, demand for the photographing lens having a great angle of view and a large diameter has been increased for suitability to various kinds of images which changes in the region to be photographed.

One typical example of the photographing lens having a great angle of view and large diameter is a triplet type, which is a single-focus lens including three lens elements being positive, negative and positive in a sequence from an object side to an image side (image surface side). JP-A 7-035972 discloses an example of the triplet type, in which two positive lens elements are formed from high refractive index material of low dispersion. The one negative lens element at the center is formed from low refractive index material of high dispersion. This combination is for the purpose of compensating for curvature of the field in the performance of the photographing lens as optical system. However, there is a shortcoming in that the main use of the high refractive index material is likely to raise the manufacturing cost.

U.S. Pat. No. 5,606,461 (corresponding to JP-A 8-201686) and U.S. Pat. No. 5,754,347 (corresponding to JP-A 9-133860) disclose the photographing lens with a reduced cost owing to the use of material with a relatively low refractive index. In the embodiments Nos. 1–6 of U.S. Pat. No. 5,606,461 (corresponding to JP-A 8-201686), the photographing lens has an aperture of f/4 as a highly clear aperture lens, but has a shortcoming in a limit in the angle of view as small as 70° or less. In the embodiments Nos. 7–11 of this patent, the photographing lens has the angle of view as great as 72°, but has a shortcoming in a small amount of light, namely the lens aperture as small as f/4.5. U.S. Pat. No. 5,754,347 (corresponding to JP-A 9-133860) discloses the photographing lens in which a lens element is formed from material with a lower refractive index than that according to U.S. Pat. No. 5,606,461. However, the photographing lens according to this has shortcomings in smallness in the angle of view, and a small amount of light, namely the lens aperture as small as f/4.5 (See the fifth embodiment of the document).

There are other three-element lenses different from triplet types, for example, U.S. Pat. No. 6,775,072 (corresponding to JP-A 2002-350720). JP-A 8-220430 discloses the photographing lens having the lens elements which are negative, positive and positive in a sequence from the object side. However, a problem of this disclosure lies in considerable distortion as great as 15.9%. JP-A 2003-149545 discloses the photographing lens having the lens elements which are negative, positive and negative in a sequence from the object side, and has f/2.8 as a sufficiently clear aperture lens. However, a problem of this disclosure lies in an upper limit of the angle of view as small as 65°.

There is no known techniques of the photographing lens in which the greatness in the angle of view is obtainable at the same time as a low cost and a sufficiently clear lens aperture.

SUMMARY OF THE INVENTION

In view of the foregoing problems, an object of the present invention is to provide a photographing lens having three lens elements, suitable for low-cost cameras such as a compact camera and photo film package, and also capable of having a comparatively great angle of view.

In order to achieve the above and other objects and advantages of this invention, a photographing lens includes first, second and third lens elements arranged in a sequence from an object side. The first lens element has a convex surface convex to the object side, at least one of surfaces of the first lens element being aspherical. The second lens element has a positive power. The third lens element has a concave surface oriented to the object side, and has a negative power. The first, second and third lens elements satisfy conditions of:

$$0.49 < |F2/F3| < 1.0, \text{ and}$$

$$0.5 < F23/F < 4$$

where F is a lens system composite focal length;
F2 is a focal length of the second lens element;
F3 is a focal length of the third lens element; and
F23 is a composite focal length of the second and third lens elements.

In one preferred embodiment, the second lens element is either a plano convex lens element convex to an image side, or a positive meniscus lens element convex to the image side, and further satisfies a condition of:

$$N1 < N3$$

where N1 is a refractive index of the first lens element;
N3 is a refractive index of the third lens element.
The photographing lens further satisfies a condition of:

$$0.35 < F2/F < 0.9.$$

At least one of surfaces of the third lens element is aspherical.

The first lens element has a power P1, and P1≧0.

The first and third lens elements are formed respectively from resin, and the second lens element is formed from glass.

In another preferred embodiment, the second lens element is either a double convex lens element having a first convex surface and a second convex surface convex to the image side and with a smaller radius of curvature than the first convex surface, or a plano convex lens element convex to the image side, and satisfies a condition of:

$$|N1-N3| < 0.13$$

where N1 is a refractive index of the first lens element; and
N3 is a refractive index of the third lens element.

In still another preferred embodiment, the first and third lens elements are formed respectively from glass.

In another preferred embodiment, the second lens element is a double convex lens element having a first convex surface and a second convex surface convex to the image side and with a smaller radius of curvature than the first convex surface, and the first, second and third lens elements are formed from one material.

At least one of surfaces of the second lens element is aspherical.

In one preferred embodiment, at least one of surfaces of the second lens element and at least one of surfaces of the third lens element are aspherical.

The first, second and third lens elements are formed respectively from glass.

In another preferred embodiment, the first, second and third lens elements are formed respectively from resin.

In still another preferred embodiment, the resin comprises a methacrylate resin.

The convex surface of the first lens element directed to the object side, and a surface of the third lens element directed to an image side are aspherical.

In another preferred embodiment, the convex surface of the first lens element directed to the object side, and a surface of the second lens element directed to an image side are aspherical.

In one preferred embodiment, surfaces of the first and third lens elements directed to an image side are aspherical.

In another preferred embodiment, surfaces of the first and second lens elements directed to an image side are aspherical, and the concave surface of the third lens element directed to the object side is aspherical.

In still another preferred embodiment, the convex surface of the first lens element directed to the object side, a surface of the second lens element directed to an image side, and the concave surface of the third lens element directed to the object side are aspherical.

In another preferred embodiment, the convex surface of the first lens element directed to the object side is aspherical, and surfaces of the second and third lens elements directed to an image side are aspherical.

In one preferred embodiment, surfaces of the first, second and third lens elements directed to the object side are aspherical.

If the term at the middle of the first condition for F2/F3 should be over the right side of the sign of the inequality, it will be difficult to set small the Petzval sum in combination of the small number of the lens elements. A clear state of f/4 of the photographing lens will not be obtained. If the term at the middle of the first condition should be under the left side of the sign of the inequality, eccentricity between the second and third lens elements will be conspicuous. This will result in unsuitability to practical production because even small errors in the dimensions will cause considerable degradation of the product.

If the term at the middle of the second condition for F23/F should be under the left side of the sign of the inequality, the first lens element will be extremely negative with excessive concavity, to cause excessive increase in the back-to-front size of the photographing lens as entirety. If the term at the middle of the second condition should be over the right side of the sign of the inequality, the first lens element will be extremely positive with excessive convexity. Angles of rays exiting toward the image surface will be great due to conspicuous eccentricity between the first lens element and the combination of the second and third. An amount of light will be too low in peripheral regions within a frame of an image.

BRIEF DESCRIPTION OF THE DRAWINGS

The above objects and advantages of the present invention will become more apparent from the following detailed description when read in connection with the accompanying drawings, in which.

Remaining figures, with FIGS. 7, 8A, 8B, 8C, 9, 10A, 10B, 10C, 11, 12A, 12B, 12C, 13, 14A, 14B, 14C, 15, 16A, 16B, 16C, 17, 18A, 18B, 18C, 19, 20A, 20B, 20C, 21, 22A, 22B, 22C, 23, 24A, 24B, 24C, 25, 26A, 26B, 26C, 27, 28A, 28B, 28C, 29, 30A, 30B, 30C, 31, 32A, 32B, 32C, 33, 34A, 34B, 34C, 35, 36A, 36B, 36C, 37, 38A, 38B, 38C, 39, 40A, 40B, 40C, 41, 42A, 42B, 42C, 43, 44A, 44B, 44C, 45, 46A, 46B, 46C, 47, 48A, 48B, 48C, 49, 50A, 50B, 50C, 51, 52A, 52B, 52C, 53, 54A, 54B, 54C, 55, 56A, 56B, 56C, 57, 58A, 58B and 58C, are cross sections and graphs illustrating photographing lenses in accordance with fourth to $29^{th}$ preferred embodiments, and aberrations thereof.

DETAILED DESCRIPTION OF THE PREFERRED EMBODIMENT(S) OF THE PRESENT INVENTION

Preferred embodiments of the invention are hereinafter described, in any of which the following conditions are satisfied:

$$0.49 < |F2/F3| < 1.0 \quad \text{Condition 1}$$

$$0.5 < F23/F < 4 \quad \text{Condition 2}$$

In FIGS. 1–14C, each of photographing lenses satisfies a combination of a Second-element Condition, Abbe No. Condition, Power Difference Condition, and Refraction Difference Condition, which are expressed as follows:

$$0.4 < F2/F < 0.9$$

$$v2 > v3$$

$$P1 < |P3| < P2$$

$$N1 < N3;$$

where F is a composite focal length of the entirety of the photographing lens;

F2 is a focal length of a second lens element in a three-element set;

F3 is a focal length of a third lens element in a three-element set;

F23 is a composite focal length of the second and third lens elements;

v2 and v3 are respectively Abbe numbers of the second and third lens elements; and P1, P2 and P3 are powers of respectively first, second and third lens elements;

N1 and N3 are respectively refractive indexes of the first and third lens elements.

Should the refractive indexes N1 and N3 not satisfy the condition expressed in the inequality, compensation for the curvature of the field will be very difficult.

Figure 1:
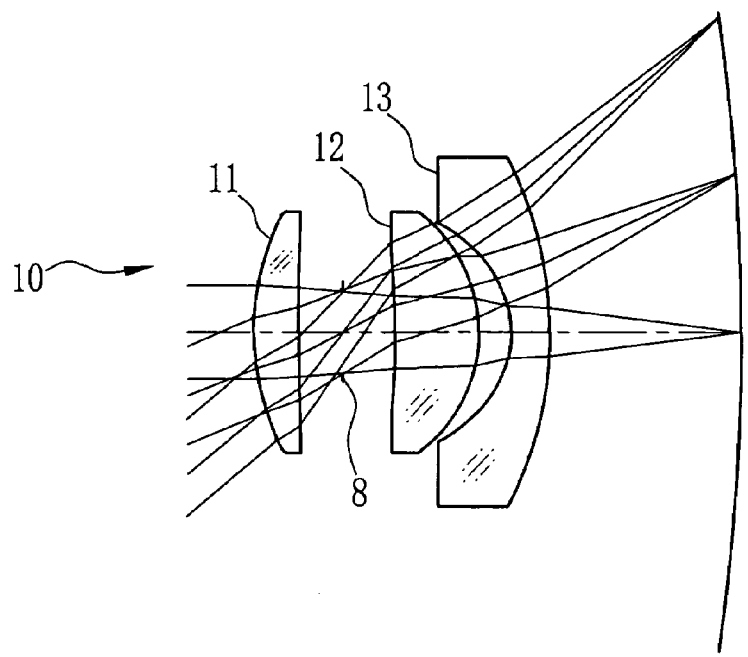
FIG. 1 is a cross section illustrating a photographing lens according to a first preferred embodiment.

In FIG. 1, a first preferred photographing lens 10 of a three-element set is illustrated, and includes first, second and third lens elements 11, 12 and 13 arranged in a direction away from the object side. The first lens element 11 has a positive power. The second lens element 12 has a positive power. The third lens element 13 has a negative power. The first lens element 11 is a positive meniscus, with a convex surface convex to the object side. The second lens element 12 is a positive meniscus, with a convex surface convex to the image side (image surface side). The third lens element 13 is a negative meniscus, of which a concave surface is oriented to the object side. The first and third lens elements 11 and 13 are formed respectively from transparent resin for optical use. The second lens element 12 is formed from glass for optical use. An aperture stop plate or diaphragm 8 is disposed between the first lens element 11 and 12. The convex surface of the first lens element 11 directed to the object side, and the concave surface of the third lens element 13 directed to the object side are aspherical.

TABLE 1 indicates lens data and aspherical coefficients of the photographing lens 10. Surfaces of lens elements are numbered in a sequence from the object side back to the image side. Various values are indicated, including a radius of curvature, a distance between the surfaces, a refractive index relative of the d line (with a wavelength of 587.56 nm), and an Abbe number. Also, the surfaces are aspherical curved surfaces satisfying a condition of:

$$Z = c\ h^2/[1+\{1-(1+K)c^2\ h^2\}^{1/2}] + A\ h^4 + B\ h^6 + C\ h^8 + D\ h^{10}$$

Note that c in the equation is 1/Ri, namely a reciprocal of a the radius of curvature, and h is a height with reference to an optical axis.

TABLE 1, NO. 1

| Surface No. | Radius of curvature | Interval | Refractive index | Abbe No. |
|---|---|---|---|---|
| 1 * | 15.937 | 3.00 | 1.492 | 57.5 |
| 2 | 149.578 | 2.97 | | |
| Aperture stop | Infinity | 3.53 | | |
| 4 | −67.608 | 5.50 | 1.807 | 35.5 |
| 5 | −10.858 | 2.25 | | |
| 6 * | −7.307 | 2.51 | 1.585 | 29.9 |
| 7 | −26.581 | 12.93 | | |

TABLE 1, NO.2

| | 1st surface | 6th surface |
|---|---|---|
| K | 0.220464 | −0.237599 |
| A | −9.48019E−05 | −7.37780E−05 |
| B | 9.96310E−07 | 5.14361E−06 |
| C | −1.93949E−08 | −1.24331E−07 |
| D | 1.46781E−10 | 1.52522E−09 |

For parameters of the photographing lens 10, various symbols are used.

F is a composite focal length of the entirety of the photographing lens 10 as optical system;

F is a focal length of the first lens element 11;

F2 is a focal length of the second lens element 12;

F3 is a focal length of the third lens element 13;

F23 is a composite focal length of the second and third lens elements 12 and 13;

fno is an f-number or ratio between the focal length F and an effective diameter of the lens aperture;

2ω is an angle of view;

L is a back-to-front total size of the photographing lens 10 in an optical axis direction;

Pz is a Petzval sum; and fb(30°) is an amount of a change in the back focus due to a change in the temperature by 30° C. relative to a reference temperature.

The photographing lens 10 has the parameters of the following.

F=26.00 mm
F1=35.99 mm
F2=15.36 mm
F3=−18.10 mm
F23=73.25 mm
fno=4.0
2ω=81.6°
L=32.60 mm
Pz=−0.510
fb(30°)=0.049 mm.

Note that the Petzval sum Pz is a result of calculation according to optical designing software Code V (trade name) produced by Optical Research Association (ORA), U.S.A.

According to those values, a ratio F2/F of F2 to F is $$F2/F = (15.36/26.00) = 0.591$$

Conditions 1 and 2 are satisfied because of the values in TABLE 1, NO. 1:

$$|F2/F3| = |15.36/−18.10| = 0.849$$

$$F23/F = (73.25/26) = 2.82$$

The Refraction Difference Condition is satisfied because of the values in TABLE 1, NO. 1:

N1=1.492, N3=1.585

The power condition of the first lens element 21 being positive is satisfied because of the values mentioned above.

Figure 2A:
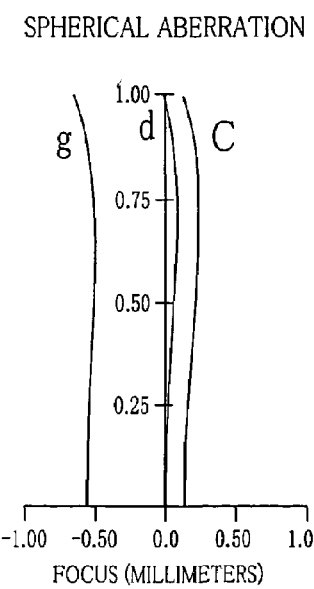
FIG. 2A is a graph illustrating a spherical aberration of the photographing lens of the embodiment.
Figure 2B:
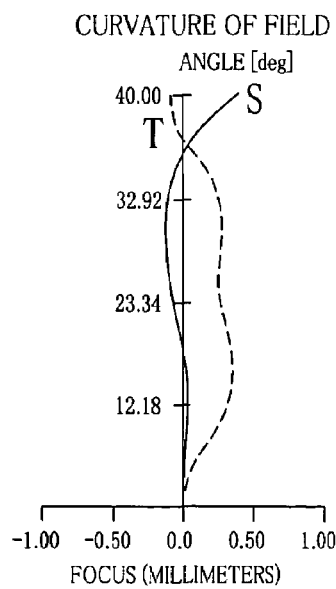
FIG. 2B is a graph illustrating a curvature of the field of the photographing lens of the embodiment.
Figure 2C:
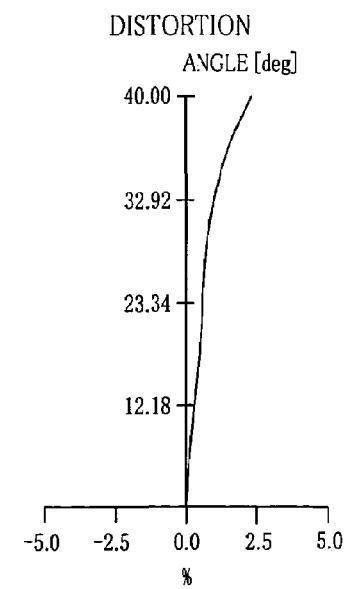
FIG. 2C is a graph illustrating distortion of the photographing lens of the embodiment.

In FIGS. 2A, 2B and 2C, aberrations of the photographing lens 10 are depicted in graphs. For the spherical aberration, the curves designated with the signs g, d and C are aberration curves in relation with respectively g line (435.84 nm), d line (587.56 nm) and C line (656.28 nm). Note that the curvature of the field as aberration is indicated with reference to the radius of curvature (−149.330 mm) obtained by conversion of a curved image surface (photo film surface) with respect to a diagonal direction, curving being at a radius of −100 mm in the horizontal direction. A curve with the sign S indicates the value related to the sagittal plane. A curve with the sign T indicates the value related to the tangential plane.

Figure 3:
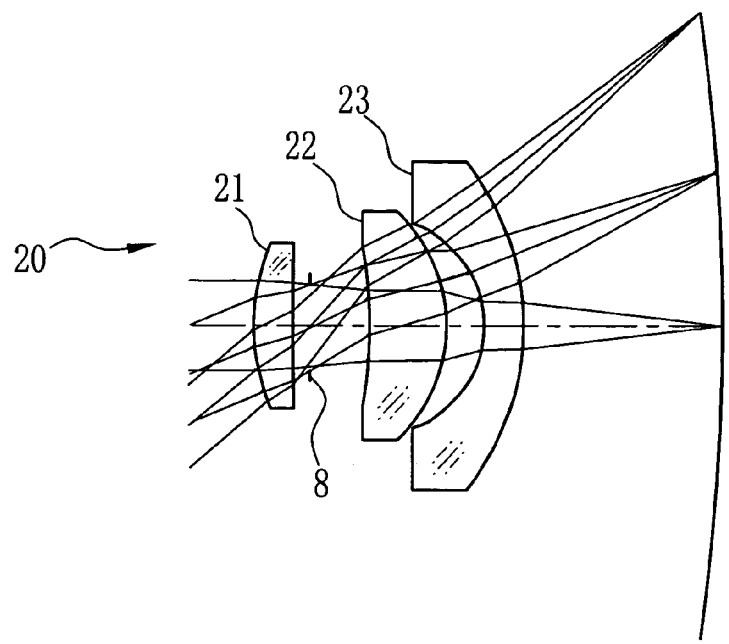
FIG. 3 is a cross section illustrating a photographing lens according to a second preferred embodiment.

In FIG. 3, a second preferred photographing lens 20 of a three-element set is illustrated, and includes first, second and third lens elements 21, 22 and 23 arranged in a direction away from the object side. The first lens element 21 has a positive power. The second lens element 22 has a positive power. The third lens element 23 has a negative power. The first lens element 21 is a positive meniscus, with a convex surface convex to the object side. The second lens element 22 is a positive meniscus, with a convex surface convex to the image side. The third lens element 23 is a negative meniscus, of which a concave surface is oriented to the object side. The first and third lens elements 21 and 23 are formed respectively from transparent resin for optical use. The second lens element 22 is formed from glass for optical use. The convex surface of the first lens element 21 directed to the object side, and the concave surface of the third lens element 23 directed to the object side are aspherical. TABLE 2 indicates lens data and aspherical coefficients of the photographing lens 20.

TABLE 2, NO. 1

| Surface No. | Radius of curvature | Interval | Refractive index | Abbe No. |
|---|---|---|---|---|
| 1 * | 13.882 | 2.70 | 1.492 | 57.5 |
| 2 | 79.620 | 1.21 | | |
| Aperture stop | Infinity | 4.06 | | |
| 4 | −39.313 | 5.30 | 1.804 | 39.6 |
| 5 | −11.047 | 2.70 | | |
| 6 * | −7.307 | 2.50 | 1.585 | 29.9 |
| 7 | −19.656 | 13.54 | | |

TABLE 2, NO. 2

| | 1st surface | 6th surface |
|---|---|---|
| K | −0.533932 | −0.182578 |
| A | −6.92699E−05 | −7.90234E−05 |
| B | 2.42443E−06 | 4.15402E−06 |
| C | −1.06459E−07 | −8.88992E−08 |
| D | 2.21466E−09 | 8.99178E−10 |

Parameters of the photographing lens 20 are as follows:
F=26.00 mm
F1=33.72 mm
F2=17.62 mm
F3=−21.49 mm
F23=84.51 mm
fno=4.03
2ω=81.4°
L=31.90 mm
Pz=−0.520
fb(30°)=0.054 mm.
According to those values, a ratio F2/F of F2 to F is $F2/F=(17.62/26.00)=0.678$ Conditions 1 and 2 are satisfied because of the values in TABLE 2, NO. 1:

$|F2/F3|=|17.62/-21.49|=0.820$ $F23/F=(84.51/26)=3.25$

The Refraction Difference Condition is satisfied because of the values in TABLE 2, NO. 1:

N1=1.492, N3=1.585

Figure 4A:
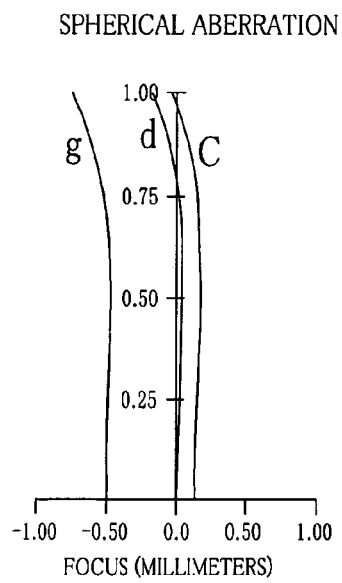
FIGS. 4A, 4B and 4C are graphs illustrating aberrations of the photographing lens of the embodiment.
Figure 4B:
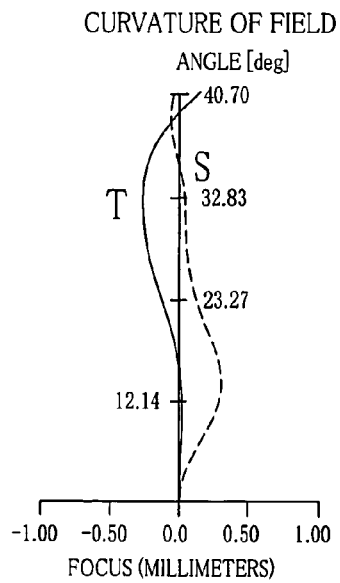
Figure 4C:
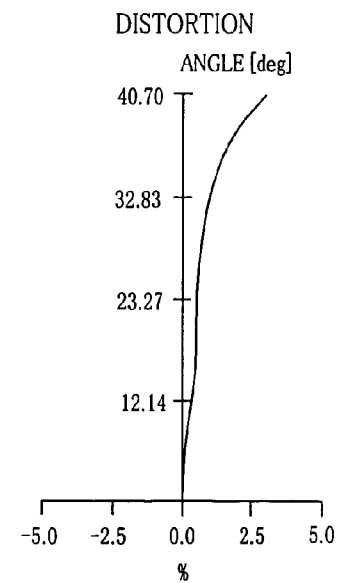

In FIGS. 4A, 4B and 4C, aberrations of the photographing lens 20 are depicted in graphs. Note that the curvature of the field as aberration is indicated with reference to the radius of curvature (−149.330 mm) obtained by conversion of a curved image surface (photo film surface) with respect to a diagonal direction, curving being at a radius of −100 mm in the horizontal direction.

Figure 5:
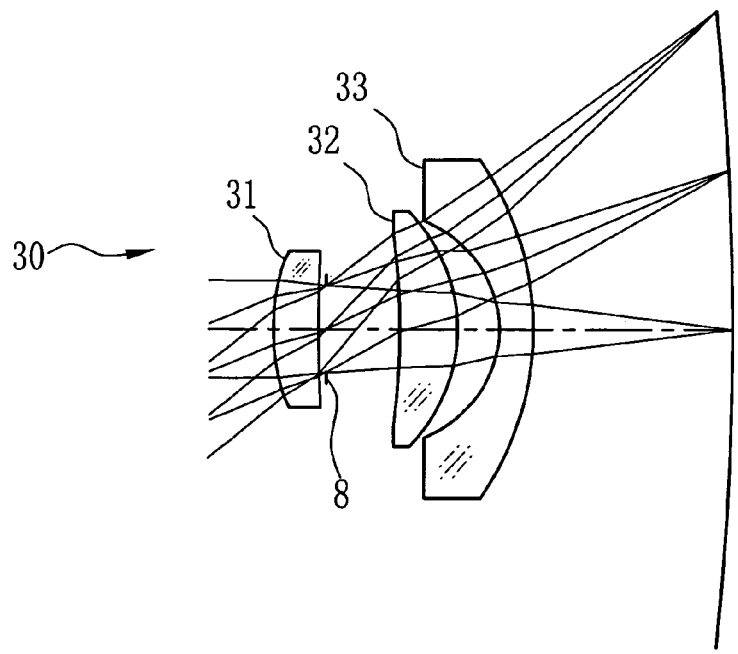
FIGS. 5, 6A, 6B and 6C are a cross section and graphs illustrating a photographing lens in accordance with a third preferred embodiment, and aberrations thereof.

In FIG. 5, a third preferred photographing lens 30 of a three-element set includes first, second and third lens elements 31, 32 and 33 arranged in a direction away from the object side. The first lens element 31 has a positive power. The second lens element 32 has a positive power. The third lens element 33 has a negative power. The first lens element 31 is a positive meniscus, with a convex surface convex to the object side. The second lens element 32 is a positive meniscus, with a convex surface convex to the image side. The third lens element 33 is a negative meniscus, of which a concave surface is oriented to the object side. The first and third lens elements 31 and 33 are formed respectively from transparent resin for optical use. The second lens element 32 is formed from glass for optical use. The convex surface of the first lens element 31 directed to the object side, and the concave surface of the third lens element 33 directed to the object side are aspherical. TABLE 3 indicates lens data and aspherical coefficients of the photographing lens 30.

TABLE 3, NO. 1

| Surface No. | Radius of curvature | Interval | Refractive index | Abbe No |
|---|---|---|---|---|
| 1 * | 13.342 | 3.00 | 1.492 | 57.5 |
| 2 | 45.196 | 0.63 | | |
| Aperture stop | Infinity | 4.87 | | |
| 4 | −48.863 | 3.99 | 1.804 | 39.6 |
| 5 | −11.144 | 2.84 | | |
| 6 * | −7.307 | 2.30 | 1.585 | 29.9 |
| 7 | −20.408 | 13.54 | | |

TABLE 3, NO. 2

| | 1st surface | 6th surface |
|---|---|---|
| K | −0.683425 | −0.174991 |
| A | −8.50081E−05 | −1.08487E−04 |
| B | 6.67624E−06 | 6.27563E−06 |
| C | −4.39182E−07 | −1.52762E−07 |
| D | 1.07957E−08 | 1.73901E−09 |

Parameters of the photographing lens 30 are as follows:
F=26.00 mm
F1=37.32 mm
F2=17.14 mm
F3=−20.80 mm
F23=71.24 mm
fno=4.03
2ω=81.0°
L=31.06 mm
Pz=−0.486
fb(30°)=0.045 mm.
According to those values, a ratio F2/F of F2 to F is $F2/F=(17.14/26.00)=0.659$ Conditions 1 and 2 are satisfied because of the values in TABLE 3, NO. 1:

$|F2/F3|=|17.14/-20.80|=0.824$ $F23/F=(71.24/26)=2.74$

The Refraction Difference Condition is satisfied because of the values in TABLE 3, NO. 1:

N1=1.492, N3=1.585

Figure 6A:
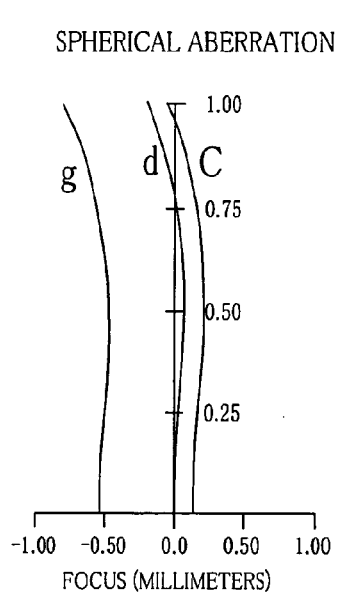
Figure 6B:
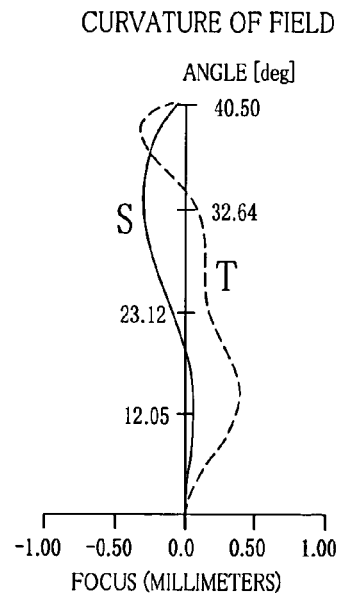
Figure 6C:
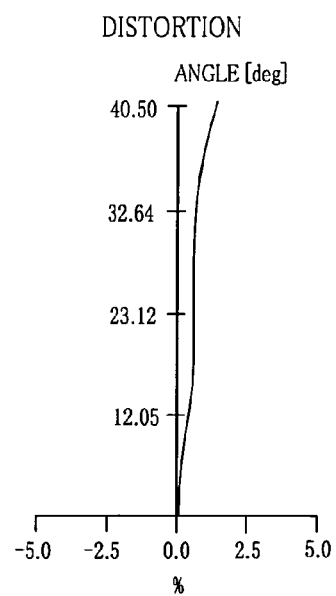

In FIGS. 6A, 6B and 6C, aberrations of the photographing lens 30 are depicted in graphs. Note that the curvature of the field as aberration is indicated with reference to the radius of curvature (−220.0 mm) obtained by conversion of a curved image surface (photo film surface) with respect to a diagonal direction, curving being at a radius of −150 mm in the horizontal direction.

Figure 7:
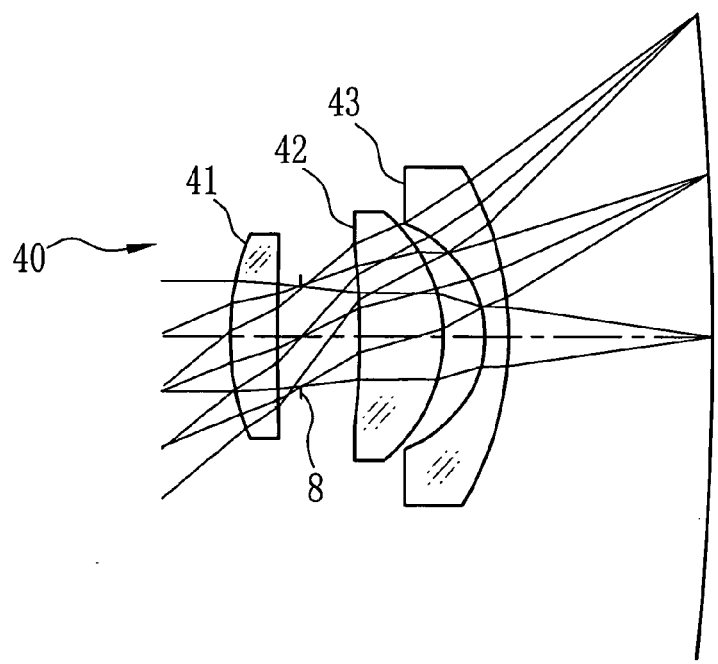

In FIG. 7, a fourth preferred photographing lens 40 of a three-element set includes first, second and third lens elements 41, 42 and 43 arranged in a direction away from the object side. The first lens element 41 has a positive power. The second lens element 42 has a positive power. The third lens element 43 has a negative power. The first lens element 41 is a positive meniscus, with a convex surface convex to the object side. The second lens element 42 is a positive meniscus, with a convex surface convex to the image side. The third lens element 43 is a negative meniscus, of which a concave surface is oriented to the object side. The first and third lens elements 41 and 43 are formed respectively from transparent resin for optical use. The second lens element 42 is formed from glass for optical use. The convex surface of the first lens element 41 directed to the object side is aspherical. The concave surface of the third lens element 43 directed to the object side is aspherical. TABLE 4 indicates lens data and aspherical coefficients of the photographing lens 40.

TABLE 4, NO. 1

| Surface No. | Radius of curvature | Interval | Refractive index | Abbe No. |
|---|---|---|---|---|
| 1 * | 15.679 | 3.20 | 1.492 | 57.5 |
| 2 | 122.457 | 1.62 | | |
| Aperture stop | Infinity | 3.88 | | |
| 4 | −45.953 | 5.50 | 1.834 | 37.3 |
| 5 | −11.219 | 2.84 | | |
| 6 * | −7.307 | 1.60 | 1.585 | 29.9 |
| 7 | −22.312 | 13.54 | | |

TABLE 4, NO. 2

| | 1st surface | 6th surface |
|---|---|---|
| K | −0.263482 | −0.237642 |
| A | −9.92807E−05 | −7.04760E−05 |
| B | 1.48574E−06 | 3.95745E−06 |
| C | −4.14879E−08 | −8.87934E−08 |
| D | 5.70686E−10 | 1.03024E−09 |

Parameters of the photographing lens 40 are as follows:
F=26.00 mm
F1=36.19 mm
F2=16.60 mm
F3=−19.34 mm
F23=77.17 mm
fno=3.5
2ω=81.0°
L=32.07 mm
Pz=−0.520
fb(30°)=0.047 mm.
According to those values, a ratio F2/F of F2 to F is $F2/F=(16.60/26.00)=0.638$ Conditions 1 and 2 are satisfied because of the values in TABLE 4, NO. 1:

$|F2/F3|=|16.60/-19.34|=0.858$ $F23/F=(77.17/26)=2.97$

The Refraction Difference Condition is satisfied because of the values in TABLE 4, NO. 1:

N1=1.492, N3=1.585

Figure 8A:
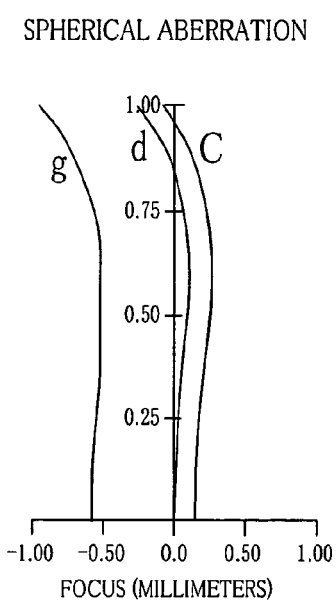
Figure 8B:
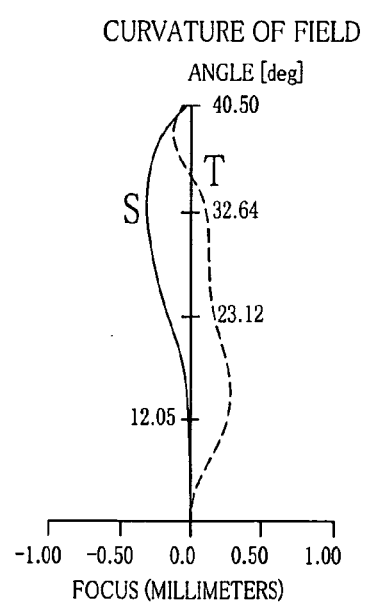
Figure 8C:
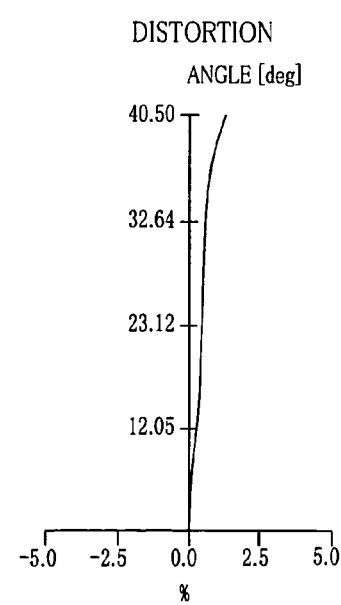

In FIGS. 8A, 8B and 8C, aberrations of the photographing lens 40 are depicted in graphs. Note that the curvature of the field as aberration is indicated with reference to the radius of curvature (−220.0 mm) obtained by conversion of a curved image surface (photo film surface) with respect to a diagonal direction, curving being at a radius of −150 mm in the horizontal direction.

Figure 9:
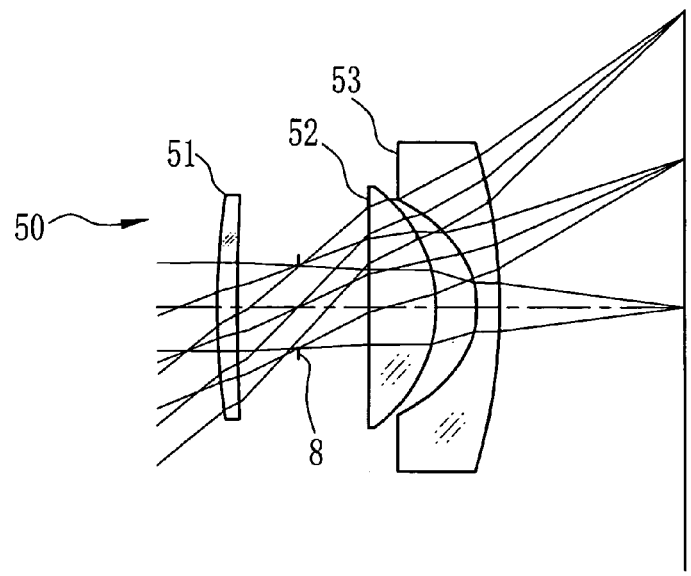

In FIG. 9, a fifth preferred photographing lens 50 of a three-element set includes first, second and third lens elements 51, 52 and 53 arranged in a direction away from the object side. The first lens element 51 has a positive power. The second lens element 52 has a positive power. The third lens element 53 has a negative power. The first lens element 51 is a double convex lens, of which a first convex surface directed to the object side has a smaller radius of curvature than that of a second convex surface directed to the image side. The second lens element 52 is a positive meniscus, with a convex surface convex to the image side. The third lens element 53 is a negative meniscus, of which a concave surface is oriented to the object side. The first and third lens elements 51 and 53 are formed respectively from transparent resin for optical use. The second lens element 52 is formed from glass for optical use. The convex surface of the first lens element 51 directed to the object side, and the concave surface of the third lens element 53 directed to the object side are aspherical. TABLE 5 indicates lens data and aspherical coefficients of the photographing lens 50.

TABLE 5, NO. 1

| Surface No. | Radius of curvature | Interval | Refractive index | Abbe No. |
|---|---|---|---|---|
| 1 * | 48.539 | 1.93 | 1.492 | 57.5 |
| 2 | −52.593 | 3.48 | | |
| Aperture stop | Infinity | 5.12 | | |
| 4 | −357.351 | 4.82 | 1.834 | 37.3 |
| 5 | −11.081 | 2.92 | | |
| 6 * | −7.307 | 1.60 | 1.585 | 29.9 |
| 7 | −43.452 | 13.56 | | |

TABLE 5, NO. 2

| | 1st surface | 6th surface |
|---|---|---|
| K | 12.435952 | −0.439380 |
| A | −1.48834E−04 | −1.21460E−04 |
| B | 9.70987E−07 | 2.87772E−06 |
| C | −5.39405E−09 | −5.94450E−08 |
| D | 0.00000 | 4.70955E−10 |

Parameters of the photographing lens 50 are as follows:
F=26.00 mm
F1=51.63 mm
F2=13.63 mm
F3=−15.27 mm
F23=48.74 mm
fno=4.0
2ω=80.80°
L=33.30 mm
Pz=−0.330
fb(30°)=0.005 mm.
According to those values, a ratio F2/F of F2 to F is $F2/F=(13.63/26.00)=0.524$ Conditions 1 and 2 are satisfied because of the values in TABLE 5, NO. 1:

$|F2/F3|=|13.63/-15.27|=0.893$ $F23/F=(48.74/26)=1.87$

The Refraction Difference Condition is satisfied because of the values in TABLE 5, NO. 1:

N1=1.492, N3=1.585

Figure 10A:
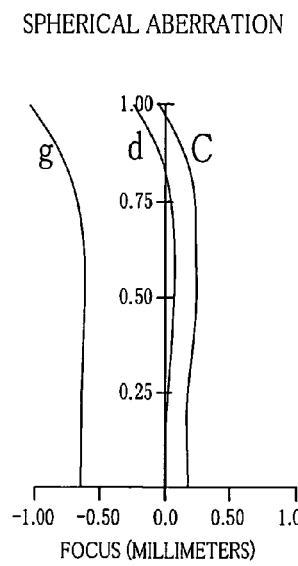
Figure 10B:
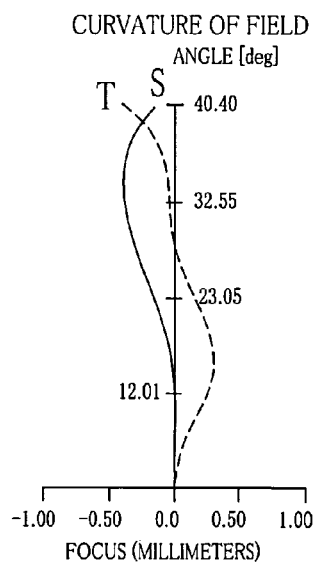
Figure 10C:
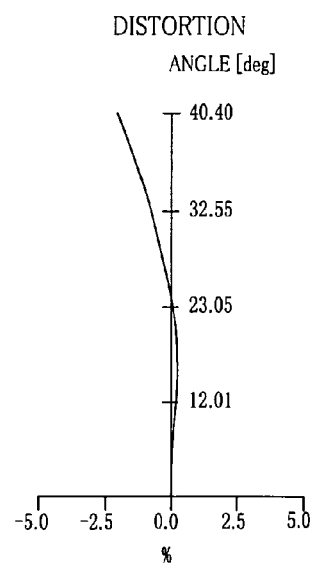

In FIGS. 10A, 10B and 10C, aberrations of the photographing lens 50 are depicted in graphs. Note that in the present embodiment, the image surface is flat as a plane.

Figure 11:
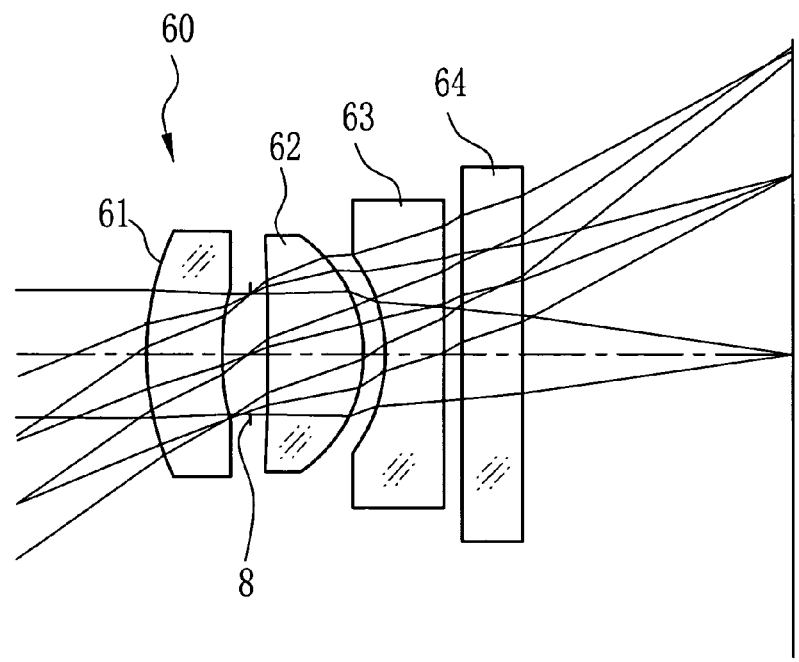

In FIG. 11, a sixth preferred photographing lens 60 of a three-element set includes first, second and third lens elements 61, 62 and 63 and a flat panel 64 arranged in a direction away from the object side. The first lens element 61 has a positive power. The second lens element 62 has a positive power. The third lens element 63 has a negative power. The first lens element 61 is a positive meniscus, with a convex surface convex to the object side. The second lens element 62 is a positive meniscus, with a convex surface convex to the image side. The third lens element 63 is a plano concave lens, of which a concave surface is oriented to the object side, and a flat surface is oriented to the image side. The first and third lens elements 61 and 63 are formed respectively from transparent resin for optical use. The second lens element 62 and the flat panel 64 are respectively formed from glass for optical use. The convex surface of the first lens element 61 directed to the image side (or $2^{nd}$ surface), and the concave surface of the third lens element 63 directed to the object side are aspherical. TABLE 6 indicates lens data and aspherical coefficients of the photographing lens 60.

TABLE 6, NO. 1

| Surface No. | Radius of curvature | Interval | Refractive index | Abbe No. |
|---|---|---|---|---|
| 1 | 5.255 | 1.25 | 1.492 | 57.5 |
| 2 * | 5.937 | 0.44 | | |
| Aperture stop | Infinity | 0.32 | | |
| 4 | −34.067 | 1.59 | 1.772 | 49.6 |
| 5 | −2.530 | 0.36 | | |
| 6 * | −3.357 | 1.00 | 1.585 | 29.9 |
| 7 | Flat | 0.3 | | |
| 8 | Flat | 1.00 | 1.5168 | 64.2 |
| 9 | Flat | 4.51 | | |

TABLE 6, NO. 2

| | $2^{nd}$ surface | $6^{th}$ surface |
|---|---|---|
| K | 0 | 2.197792 |
| A | 1.20187E−02 | −1.03414E−02 |
| B | −4.54356E−03 | 1.61130E−02 |
| C | 1.56946E−02 | −6.81249E−03 |
| D | −5.29393E−03 | 1.29696E−03 |

Parameters of the photographing lens 60 are as follows:
F=7.50 mm
F1=58.02 mm
F2=3.46 mm
F3=−5.74 mm
F23=7.76 mm
fno=3.5
2ω=70.0°
L=10.76 mm
Pz=−0.110
fb(30°)=−0.024 mm.
According to those values, a ratio F2/F of F2 to F is $F2/F=(3.46/7.50)=0.461$ Conditions 1 and 2 are satisfied because of the values in TABLE 6, NO. 1:

$|F2/F3|=|3.46/−5.74|=0.603$ $F23/F=(7.76/7.5)=1.03$

The Refraction Difference Condition is satisfied because of the values in TABLE 6, NO. 1:

N1=1.492, N3=1.585

Figure 12A:
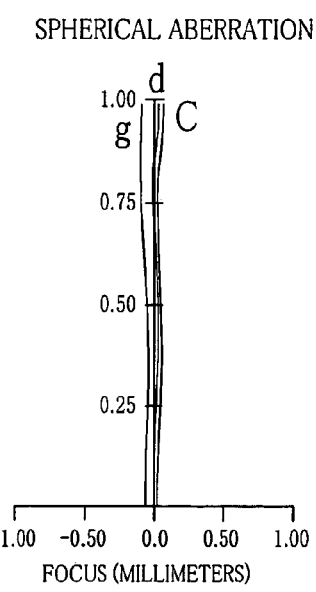
Figure 12B:
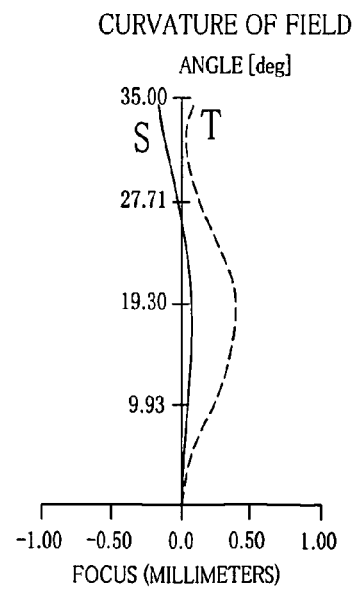
Figure 12C:
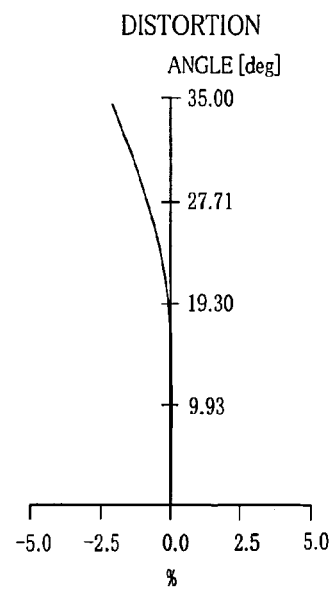

In FIGS. 12A, 12B and 12C, aberrations of the photographing lens 60 are depicted in graphs. Note that in the present embodiment, the image surface is flat as a plane.

Figure 13:
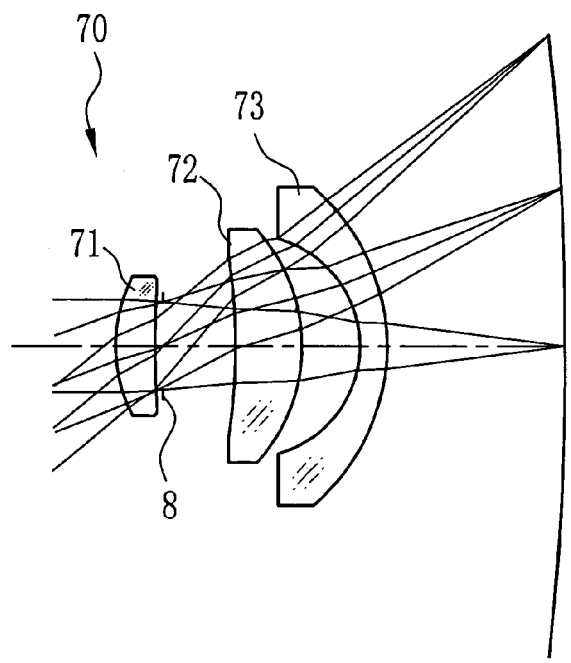

In FIG. 13, a seventh preferred photographing lens 70 of a three-element set includes first, second and third lens elements 71, 72 and 73 arranged in a direction away from the object side. The first lens element 71 has a positive power. The second lens element 72 has a positive power. The third lens element 73 has a negative power. The first lens element 71 is a positive meniscus, with a convex surface convex to the object side. The second lens element 72 is a positive meniscus, with a convex surface convex to the image side. The third lens element 73 is a negative meniscus, of which a concave surface is oriented to the object side. The first and third lens elements 71 and 73 are formed respectively from transparent resin for optical use. The second lens element 72 is formed from glass for optical use. The convex surface of the first lens element 71 directed to the object side, and the concave surface of the third lens element 73 directed to the object side are aspherical. TABLE 7 indicates lens data and aspherical coefficients of the photographing lens 70.

TABLE 7, NO. 1

| Surface No. | Radius of curvature | Interval | Refractive index | Abbe No. |
|---|---|---|---|---|
| 1 * | 12.518 | 2.52 | 1.492 | 57.5 |
| 2 | 42.215 | 0.637 | | |
| Aperture stop | Infinity | 4.86 | | |
| 4 | −48.048 | 4.50 | 1.764 | 40.3 |
| 5 | −13.000 | 4.137 | | |
| 6 * | −7.307 | 1.70 | 1.585 | 29.9 |
| 7 | −14.901 | 12.11 | | |

TABLE 7, NO. 2

| | $1^{st}$ surface | $6^{th}$ surface |
|---|---|---|
| K | −0.609001 | −0.207416 |
| A | −8.01530E−05 | −1.23676E−04 |
| B | 1.04281E−05 | 5.69937E−06 |
| C | −7.88464E−07 | −1.24600E−07 |
| D | 2.08308E−08 | 1.18880E−09 |

Parameters of the photographing lens 70 are as follows:
F=26.00 mm
F1=35.19 mm
F2=22.10 mm
F3=−26.72 mm
F23=97.67 mm
fno=4.03
2ω=81.4°
L=30.46 mm
Pz=−0.530
fb(30°)=0.079 mm.
According to those values, a ratio F2/F of F2 to F is $F2/F=(22.10/26.00)=0.85$ Conditions 1 and 2 are satisfied because of the values in TABLE 7, NO. 1:

$$|F2/F3|=|22.10/-26.72|=0.827$$

$$F23/F=(97.67/26)=3.76$$

The Refraction Difference Condition is satisfied because of the values in TABLE 7, NO. 1:

$$N1=1.492, N3=1.585$$

Figure 14A:
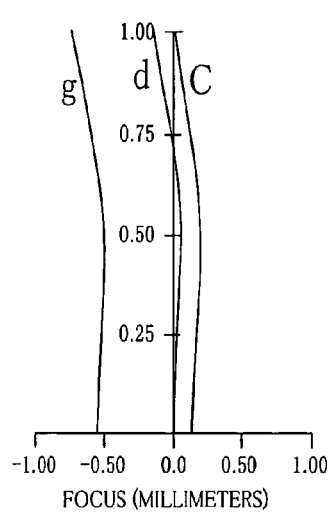
Figure 14B:
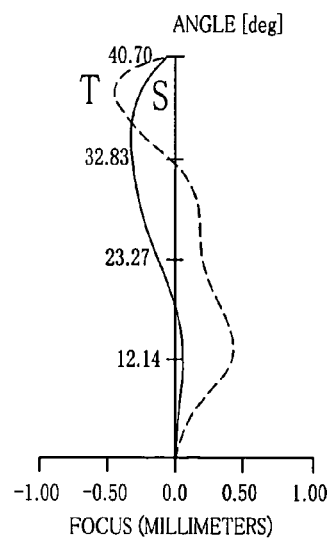
Figure 14C:
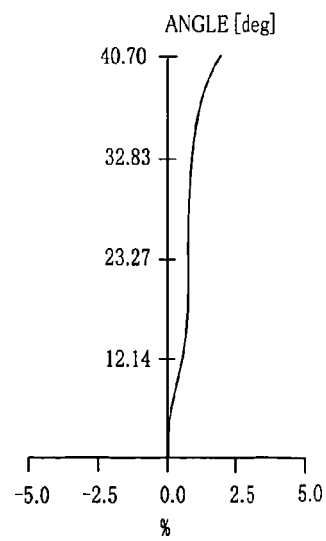

In FIGS. 14A, 14B and 14C, aberrations of the photographing lens 70 are depicted in graphs. Note that the curvature of the field as aberration is indicated with reference to the radius of curvature (−220.0 mm) obtained by conversion of a curved image surface (photo film surface) with respect to a diagonal direction, curving being at a radius of −150 mm in the horizontal direction.

Note that the first and third lens elements according to any of the above embodiments are formed from resin. The second lens element is formed from glass. However, the first and/or third lens element can be formed from glass according to the invention. Specifically according to recent decrease in the manufacturing cost of aspherical glass lens by utilizing techniques of glass molded lenses, a photographing lens can be constructed with a highly clear aperture and great angle of view without considerable increase in the cost.

FIGS. 15–30C illustrate other preferred embodiments of the invention, in which each of photographing lenses satisfies a combination of the Power Difference Condition Second-element Condition, and Refraction Difference Condition, which are:

$$P1<|P3|<P2$$

$$0.42<F2/F<0.9$$

$$|N1-N3|<0.13$$

Should the refractive indexes not satisfy the Refraction Difference Condition expressed in the inequality, compensation for the curvature of the field will be very difficult.

Figure 15:
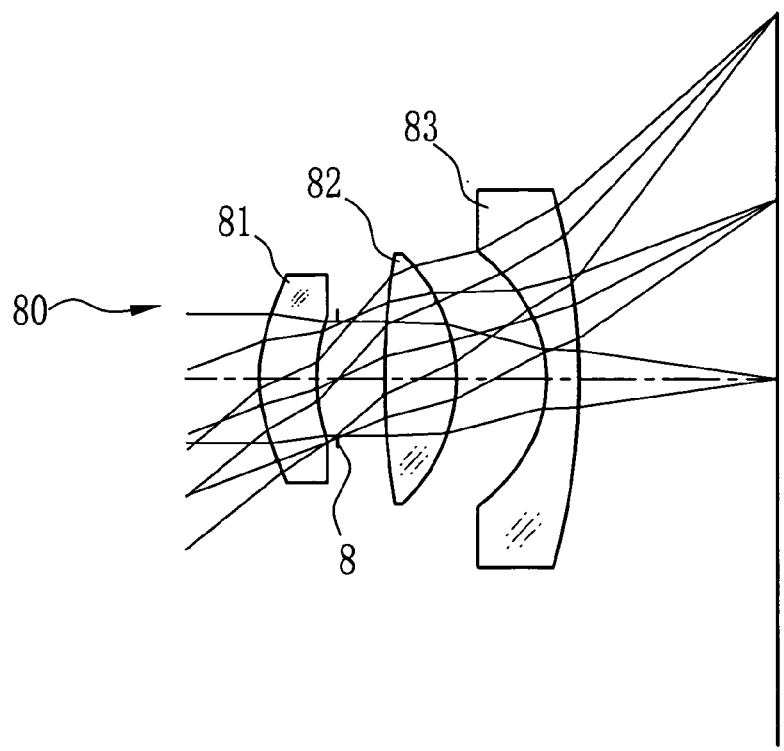

In FIG. 15, an eighth preferred photographing lens 80 of a three-element set includes first, second and third lens elements 81, 82 and 83 arranged in a direction away from the object side. The first lens element 81 has a positive power. The second lens element 82 has a positive power. The third lens element 83 has a negative power. The first lens element 81 is a positive meniscus, with a convex surface convex to the object side. The second lens element 82 is a double convex lens, of which a first convex surface directed to the object side has smaller convexity than that of a second convex surface directed to the image side (image surface side). The third lens element 83 is a negative meniscus, of which a concave surface is oriented to the object side. The three lens elements 81, 82 and 83 are formed respectively from glass for optical use. An aperture stop plate or diaphragm 8, and a light-shielding plate are disposed between the first and second lens elements 81 and 82. The aperture stop plate defines an aperture stop, the light-shielding plate preventing flare. The convex surface of the first lens element 81 directed to the object side, and the concave surface of the third lens element 83 directed to the object side are aspherical. TABLE 8 indicates lens data and aspherical coefficients of the photographing lens 80.

TABLE 8, NO. 1

| Surface No. | Radius of curvature | Interval | Refractive index | Abbe No. |
|---|---|---|---|---|
| 1 * | 10.426 | 3.21 | 1.609 | 57.8 |
| 2 | 10.575 | 1.14 | | |
| Aperture stop | Infinity | 1.00 | | |
| Light-shielding plate | — | 1.76 | | |
| 5 | 47.653 | 3.95 | 1.62 | 60.3 |
| 6 | −10.336 | 5.00 | | |
| 7 * | −8.977 | 1.80 | 1.669 | 55.4 |
| 8 | −45.038 | 11.4 | | |

TABLE 8, NO. 2

| | 1st surface | 7th surface |
|---|---|---|
| K | −0.093206 | −0.323400 |
| A | −1.65775E−04 | −1.29004E−04 |
| B | 1.83648E−07 | 2.96978E−06 |
| C | −1.43813E−07 | −6.18974E−08 |
| D | 7.08387E−10 | 4.03007E−10 |

Parameters of the photographing lens 80 are as follows.
F=26.00 mm
F1=132.75 mm
F2=14.06 mm
F3=−17.10 mm
F23=29.31 mm
fno=3.5
2ω=81.4°
L=29.11 mm
Pz=−0.351
fb(30°)=0.000

According to those values, a ratio F2/F of F2 to F is $$F2/F=(14.06/26.00)=0.541$$

Also, Conditions 1 and 2 and the Refraction Difference Condition are satisfied because of the values in TABLE 8, NO. 1:

$$|N1-N3|=|1.609-1.669|=0.06<0.13$$

$$|F2/F3|=|14.06/-17.10|=0.820$$

$$F23/F=(29.31/26)=1.13$$

Figure 16A:
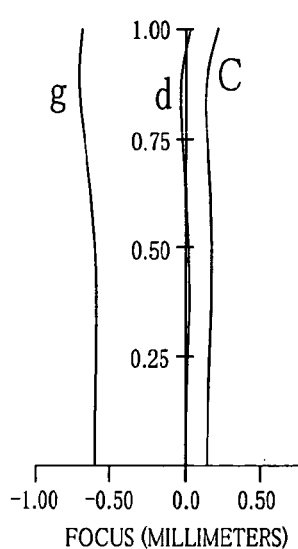
Figure 16B:
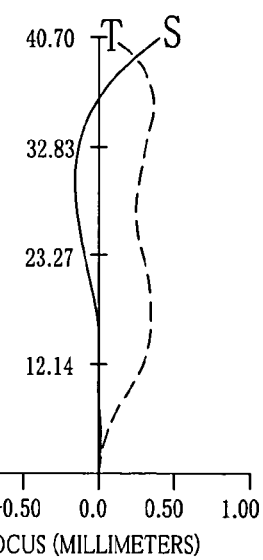
Figure 16C:
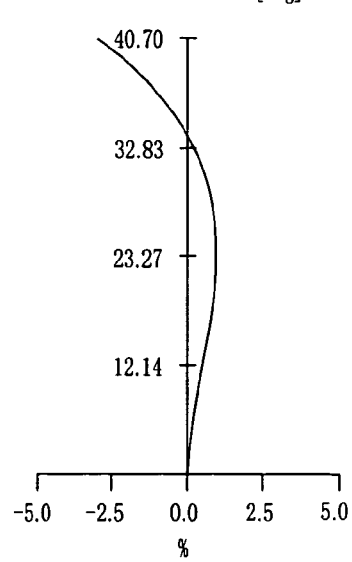

In FIGS. 16A, 16B and 16C, aberrations of the photographing lens 80 are depicted in graphs. Note that in the present embodiment, the image surface is flat as a plane.

Figure 17:
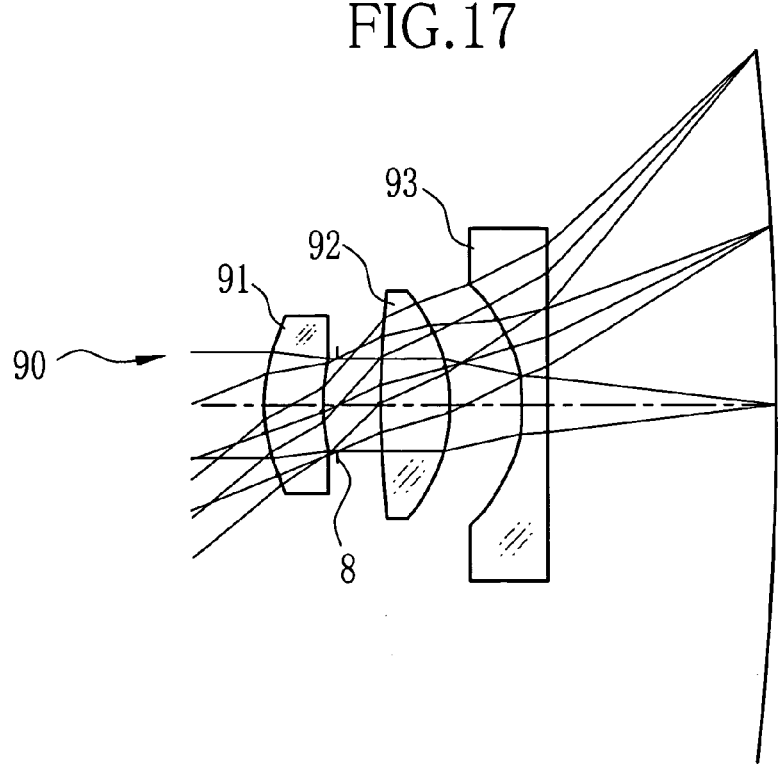

In FIG. 17, a ninth preferred photographing lens 90 of a three-element set includes first, second and third lens elements 91, 92 and 93 arranged in a direction away from the object side. The first lens element 91 has a positive power. The second lens element 92 has a positive power. The third lens element 93 has a negative power. The first lens element 91 is a positive meniscus, with a convex surface convex to the object side. The second lens element 92 is a double convex lens, of which a first convex surface directed to the object side has smaller convexity than that of a second convex surface directed to the image side. The third lens element 93 is a plano concave lens, of which a concave surface is oriented to the object side, and a flat surface is oriented to the image side. The first and third lens elements 91 and 93 are formed respectively from transparent resin for optical use. The second lens element 92 is formed from glass for optical use. An aperture stop plate is disposed between the first and second lens elements 91 and 92. The convex surface of the first lens element 91 directed to the object side, and the concave surface of the third lens element 93 directed to the object side are aspherical. TABLE 9 indicates lens data and aspherical coefficients of the photographing lens 90.

TABLE 9, NO. 1

| Surface No. | Radius of curvature | Interval | Refractive index | Abbe No. |
|---|---|---|---|---|
| 1 * | 10.478 | 3.42 | 1.492 | 57.5 |
| 2 | 11.071 | 0.92 | | |
| Aperture stop | Infinity | 2.59 | | |
| 4 | 56.655 | 4.07 | 1.62 | 60.3 |
| 5 | −10.907 | 4.25 | | |
| 6 * | −10.824 | 1.60 | 1.492 | 57.5 |
| 7 | Flat | 13.34 | | |

TABLE 9, NO. 2

| | 1st surface | 6th surface |
|---|---|---|
| K | −0.486214 | −0.751095 |
| A | −1.29856E−04 | −1.90684E−04 |
| B | 8.99834E−07 | 1.88847E−06 |
| C | −2.26706E−07 | −4.32194E−08 |
| D | 2.90362E−09 | 2.55912E−10 |

Parameters of the photographing lens 90 are as follows.
F=26.00 mm
F1=136.99 mm
F2=15.10 mm
F3=−22.00 mm
F23=28.22 mm
fno=4.02
2ω=82.0°
L=30.05 mm
Pz=−0.414
fb(30°)=−0.017 mm.
According to those values, a ratio F2/F of F2 to F is $F2/F=(15.10/26.00)=0.581$ Also, Conditions 1 and 2 and the Refraction Difference Condition are satisfied because of the values in TABLE 9, NO. 1:

$|N1-N3|=|1.492-1.492|=0<0.13$ $|F2/F3|=|15.10/-22.00|=0.686$ $F23/F=(28.22/26)=1.085$

Figure 18A:
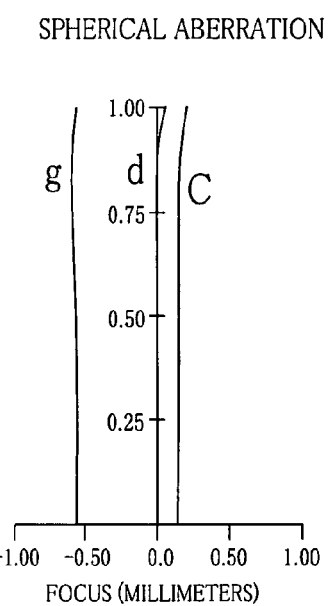
Figure 18B:
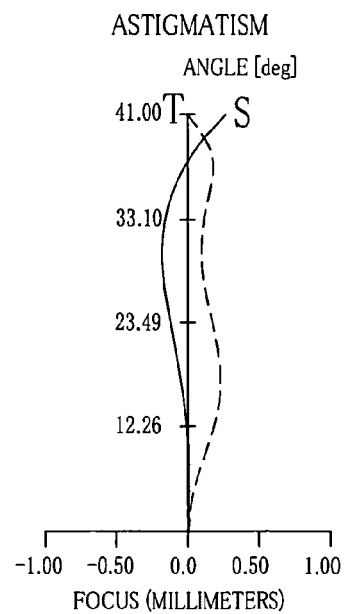
Figure 18C:
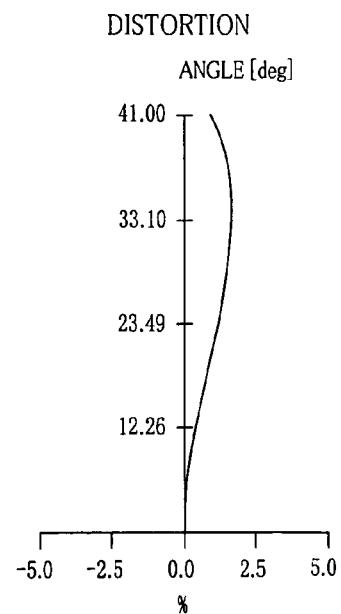

In FIGS. 18A, 18B and 18C, aberrations of the photographing lens 90 are depicted in graphs. Note that the aberrations are indicated with reference to the radius of curvature (−220.0 mm) obtained by conversion of a curved image surface (photo film surface) with respect to a diagonal direction, curving being at a radius of −150 mm in the horizontal direction.

Figure 19:
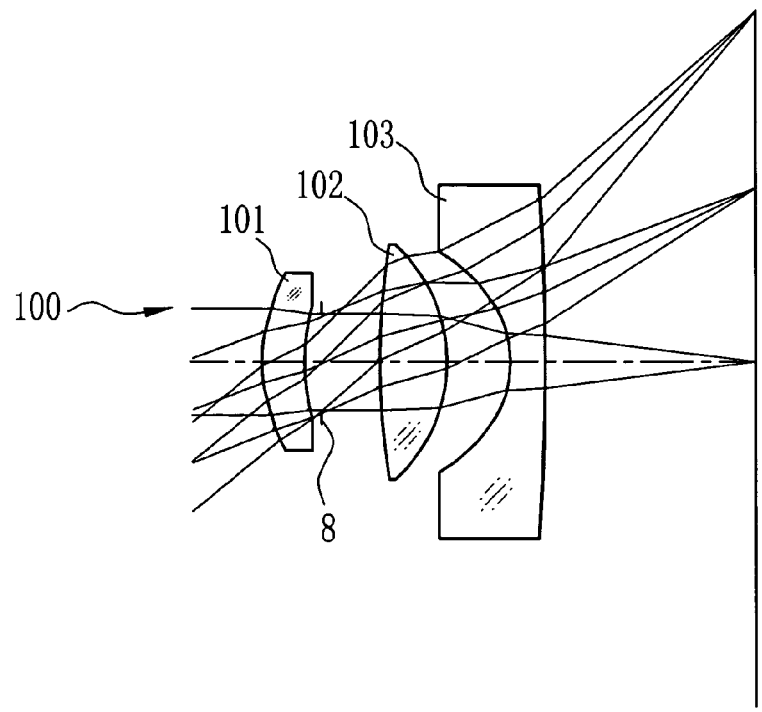

In FIG. 19, a 10th preferred photographing lens 100 of a three-element set includes first, second and third lens elements 101, 102 and 103 arranged in a direction away from the object side. The first lens element 101 has a positive power. The second lens element 102 has a positive power. The third lens element 103 has a negative power. The first lens element 101 is a positive meniscus, with a convex surface convex to the object side. The second lens element 102 is a double convex lens, of which a first convex surface directed to the object side has smaller convexity than that of a second convex surface directed to the image side. The third lens element 103 is a negative meniscus, of which a concave surface is oriented to the object side. The first and third lens elements 101 and 103 are formed respectively from transparent resin for optical use. The second lens element 102 is formed from glass for optical use. The convex surface of the first lens element 101 directed to the object side, and the concave surface of the third lens element 103 directed to the object side is aspherical. TABLE 10 indicates lens data and aspherical coefficients of the photographing lens 100.

TABLE 10, NO. 1

| Surface No. | Radius of curvature | Interval | Refractive Index | Abbe No. |
|---|---|---|---|---|
| 1 * | 9.891 | 2.50 | 1.492 | 57.5 |
| 2 | 11.894 | 1.00 | | |
| Aperture stop | Infinity | 0.89 | | |
| Light-shielding plate | — | 2.57 | | |
| 5 | 43.230 | 3.94 | 1.62 | 60.3 |
| 6 | −9.902 | 3.60 | | |
| 7 * | −7.068 | 2.00 | 1.492 | 57.5 |
| 8 | −198.673 | 12.65 | | |

TABLE 10, NO. 2

| | 1st surface | 7th surface |
|---|---|---|
| K | 0.351203 | −0.531126 |
| A | −2.50116E−04 | −2.15313E−04 |
| B | −1.90922E−06 | 1.98615E−06 |
| C | −2.00810E−07 | −9.27979E−08 |
| D | 1.86902E−09 | 6.81390E−10 |

Parameters of the photographing lens 100 are as follows.
F=26.00 mm
F1=84.57 mm
F2=13.37 mm
F3=−14.95 mm
F23=34.62 mm
fno=4.03
2ω=80.0°
L=29.02 mm
Pz=−0.230
fb(30°)=−0.024 mm.
According to those values, a ratio F2/F of F2 to F is $F2/F=(13.37/26.00)=0.514$ Conditions 1 and 2 and the Refraction Difference Condition are satisfied because of the values in TABLE 10, NO. 1:

$|N1-N3|=|1.492-1.492|=0<0.13$ $|F2/F3|=|13.37/-14.95|=0.894$ $F23/F=(34.62/26)=1.33$

Figure 20A:
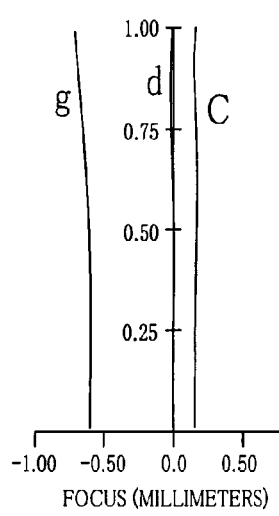
Figure 20B:
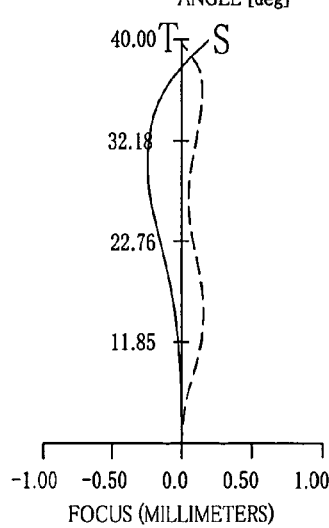
Figure 20C:
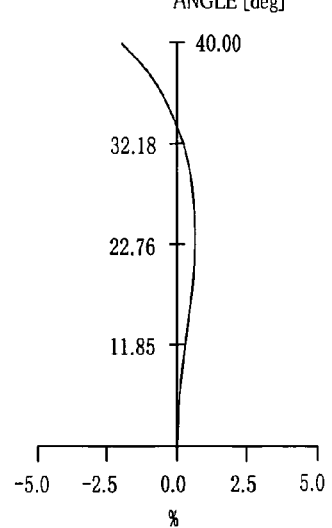

In FIGS. 20A, 20B and 20C, aberrations of the photographing lens 100 are depicted in graphs.

Figure 21:
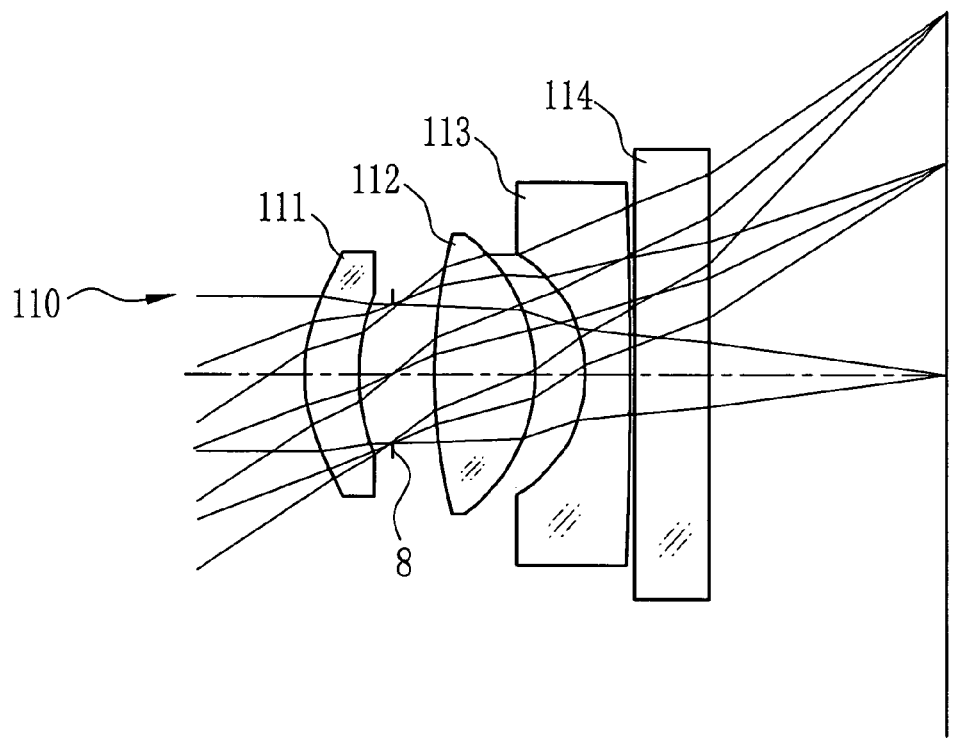

In FIG. 21, an 11th preferred photographing lens 110 of a three-element set includes first, second and third lens elements 111, 112 and 113, and a flat panel 114 arranged in a direction away from the object side. The first lens element 111 has a positive power. The second lens element 112 has a positive power. The third lens element 113 has a negative power. The first lens element 111 is a positive meniscus, with a convex surface convex to the object side. The second lens element 112 is a double convex lens, of which a first convex surface directed to the object side has smaller convexity than that of a second convex surface directed to the image side. The third lens element 113 is a negative meniscus, of which a concave surface is oriented to the object side. The first and third lens elements 111 and 113 are formed respectively from transparent resin for optical use. The second lens element 112 and the flat panel 114 are formed from glass for optical use. The convex surface of the first lens element 111 directed to the object side, and the concave surface of the third lens element 113 directed to the object side is aspherical. TABLE 11 indicates lens data and aspherical coefficients of the photographing lens 110.

TABLE 11, NO. 1

| Surface No. | Radius of curvature | Interval | Refractive index | Abbe No. |
|---|---|---|---|---|
| 1 * | 5.123 | 1.44 | 1.492 | 57.5 |
| 2 | 5.980 | 0.94 | | |
| Aperture stop | Infinity | 1.20 | | |
| 4 | 20.032 | 2.69 | 1.603 | 60.7 |
| 5 | −5.166 | 1.42 | | |
| 6 * | −3.924 | 1.20 | 1.492 | 57.5 |
| 7 | −184.399 | 0.10 | | |
| 8 | Flat | 2.00 | 1.516 | 64.2 |
| 9 | Flat | | | |

TABLE 11, NO. 2

| | 1st surface | 6th surface |
|---|---|---|
| K | −0.710506 | −0.233210 |
| A | −3.29454E−04 | −8.01799E−04 |
| B | −3.83906E−05 | 1.09560E−04 |
| C | −5.63134E−06 | −1.34086E−05 |
| D | 3.45353E−08 | 5.87336E−07 |

Parameters of the photographing lens 110 are as follows.
F=15.00 mm
F1=46.78 mm
F2=7.09 mm
F3=−8.17 mm
F23=19.71 mm
fno=3.5
2ω=70.0°
L=17.48 mm
Pz=−0.146
fb(30°)=−0.022 mm.

According to those values, a ratio F2/F of F2 to F is $F2/F=(7.09/15.00)=0.473$

Conditions 1 and 2 and the Refraction Difference Condition are satisfied because of the values in TABLE 11, NO. 1:

$|N1-N3|=|1.492-1.492|=0<0.13$ $|F2/F3|=|7.09/-8.17|=0.868$ $F23/F=(19.71/15)=1.31$

Figure 22A:
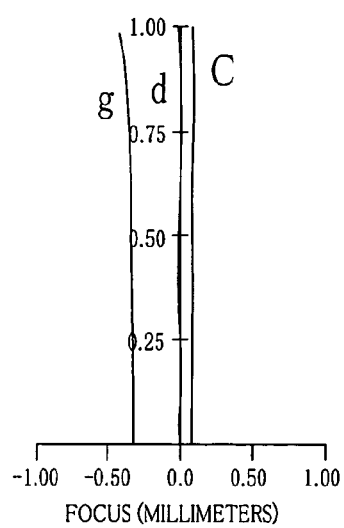
Figure 22B:
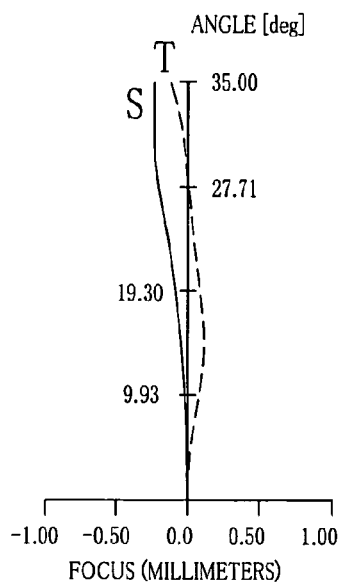
Figure 22C:
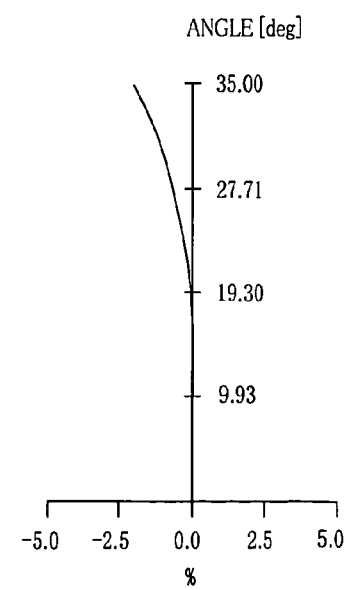

In FIGS. 22A, 22B and 22C, aberrations of the photographing lens 110 are indicated in graphs. Note that in the present embodiment, the image surface is flat as a plane.

Figure 23:
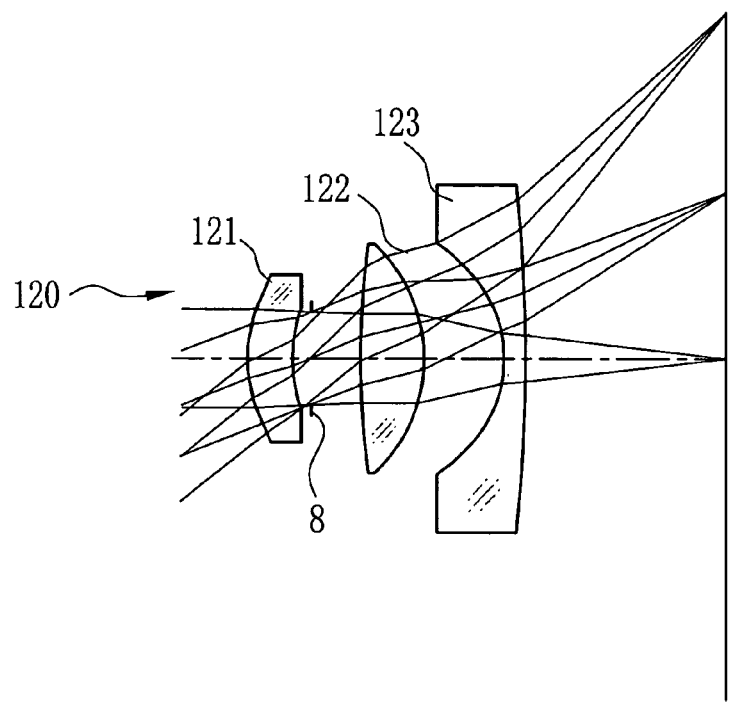

In FIG. 23, a 12th preferred photographing lens 120 of a three-element set includes first, second and third lens elements 121, 122 and 123 arranged in a direction away from the object side. The first lens element 121 has a positive power. The second lens element 122 has a positive power. The third lens element 123 has a negative power. The first lens element 121 is a positive meniscus, with a convex surface convex to the object side. The second lens element 122 is a double convex lens, of which a first convex surface directed to the object side has smaller convexity than that of a second convex surface directed to the image side. The third lens element 123 is a negative meniscus, of which a concave surface is oriented to the object side. The first and third lens elements 121 and 123 are formed respectively from transparent resin for optical use. The second lens element 122 is formed from glass for optical use. An aperture stop plate is disposed between the first and second lens elements 121 and 122. The convex surface of the first lens element 121 directed to the object side, and the concave surface of the third lens element 123 directed to the object side are aspherical. TABLE 12 indicates lens data and aspherical coefficients of the photographing lens 120.

TABLE 12, NO. 1

| Surface No. | Radius of curvature | Interval | Refractive index | Abbe No. |
|---|---|---|---|---|
| 1 * | 9.446 | 2.70 | 1.492 | 57.5 |
| 2 | 10.084 | 1.04 | | |
| Aperture stop | Infinity | 1.00 | | |
| Light-shielding plate | — | 2.09 | | |
| 5 | 62.442 | 3.81 | 1.62 | 60.3 |
| 6 | −10.254 | 4.91 | | |
| 7 * | −8.216 | 1.20 | 1.492 | 57.5 |
| 8 | −135.131 | 12.38 | | |

TABLE 12, NO. 2

| | 1st surface | 7th surface |
|---|---|---|
| K | −0.004061 | −0.373953 |
| A | −2.38741E−04 | −1.34928E−04 |
| B | 1.29380E−06 | 2.70725E−06 |
| C | −3.36871E−07 | −6.20857E−08 |
| D | 3.23430E−09 | 4.44408E−10 |

Parameters of the photographing lens 120 are as follows.
F=26.00 mm
F1=126.68 mm
F2=14.50 mm
F3=−17.83 mm
F23=29.66 mm
fno=4.03
2ω=81.0°
L=28.97 mm
Pz=−0.244
fb(30°)=−0.016 mm.

According to those values, a ratio F2/F of F2 to F is $F2/F=(14.50/26.00)=0.558$ Conditions 1 and 2 and the Refraction Difference Condition are satisfied because of the values in TABLE 12, NO. 1:

$|N1-N3|=|1.492-1.492|=0<0.13$ $|F2/F3|=|14.50/-17.83|=0.813$ $F23/F=(29.66/26)=1.14$

Figure 24A:
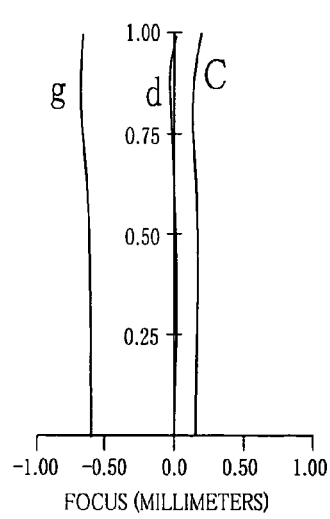
Figure 24B:
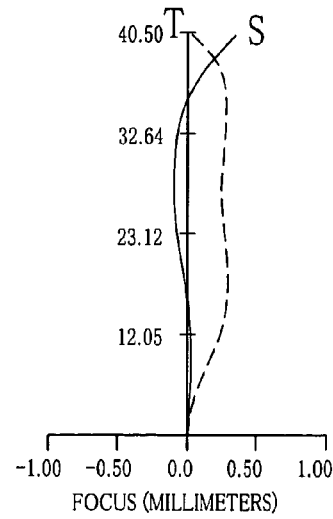
Figure 24C:
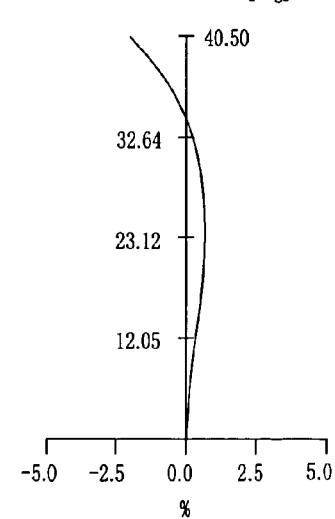

In FIGS. 24A, 24B and 24C, aberrations of the photographing lens 120 are depicted in graphs. Note that in the present embodiment, the image surface is flat as a plane.

Figure 25:
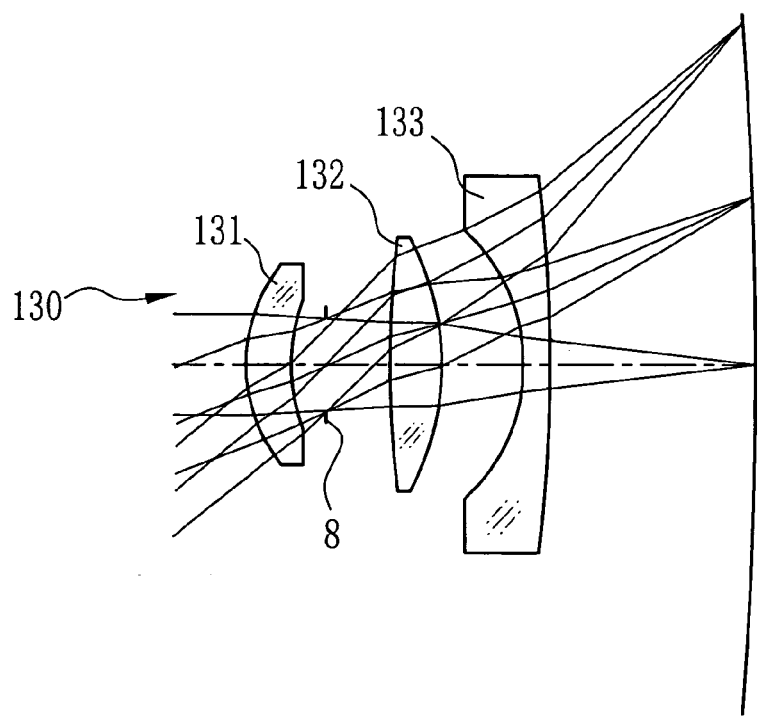

In FIG. 25, a 13th preferred photographing lens 130 of a three-element set includes first, second and third lens elements 131, 132 and 133 arranged in-a direction away from the object side. The first lens element 131 has a positive power. The second lens element 132 has a positive power. The third lens element 133 has a negative power. The first lens element 131 is a positive meniscus, with a convex surface convex to the object side. The second lens element 132 is a double convex lens, of which a first convex surface directed to the object side has smaller convexity than that of a second convex surface directed to the image side. The third lens element 133 is a negative meniscus, of which a concave surface is oriented to the object side. The first and third lens elements 131 and 133 are formed respectively from transparent resin for optical use. The second lens element 132 is formed from glass for optical use. An aperture stop plate is disposed between the first and second lens elements 131 and 132. The convex surface of the first lens element 131 directed to the object side, and the concave surface of the third lens element 133 directed to the object side are aspherical. TABLE 13 indicates lens data and aspherical coefficients of the photographing lens 130.

TABLE 13, NO. 1

| Surface No. | Radius of curvature | Interval | Refractive index | Abbe No. |
| --- | --- | --- | --- | --- |
| 1 * | 9.10546 | 2.70 | 1.492 | 57.5 |
| 2 | 11.930 | 2.11 | | |
| Aperture stop | Infinity | 3.69 | | |
| 4 | 61.035 | 3.02 | 1.713 | 53.9 |
| 5 | −19.184 | 4.69 | | |
| 6 * | −13.298 | 1.60 | 1.492 | 57.5 |
| 7 | −85.880 | 12.09 | | |

TABLE 13, NO. 2

| | 1st surface | 6th surface |
| --- | --- | --- |
| K | −0.3709 | −7.833239 |
| A | −4.7846E−5 | −5.6029E−4 |
| B | 1.3299E−6 | 6.7414E−6 |
| C | −8.5525E−8 | −7.3762E−8 |
| D | −2.7702E−10 | 3.6795E−10 |

Parameters of the photographing lens 130 are as follows.

F=26.00 mm

F1=59.42 mm

F2=20.797 mm

F3=−32.214 mm

F23=41.02 mm fno=4.03

2ω=81.0°

L=29.9 mm

Pz=−0.494 fb(30°)=0.038 mm.

According to those values, a ratio F2/F of F2 to F is $F2/F=(20.797/26.00)=0.80$ Conditions 1 and 2 and the Refraction Difference Condition are satisfied because of the values in TABLE 13, NO. 1:

$|N1-N3|=|1.492-1.492|=0<0.13$ $|F2/F3|=|20.797/-32.214|=0.646$ $F23/F=(41.02/26)=1.58$

Figure 26A:
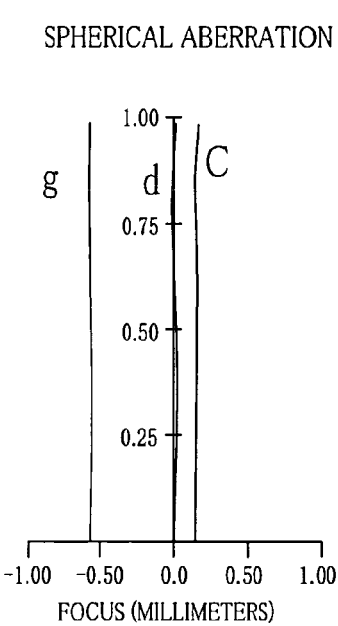
Figure 26B:
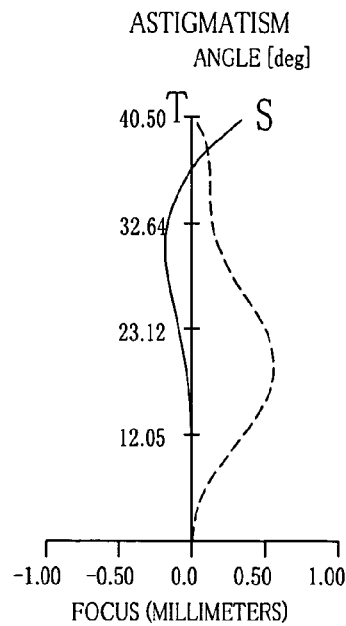
Figure 26C:
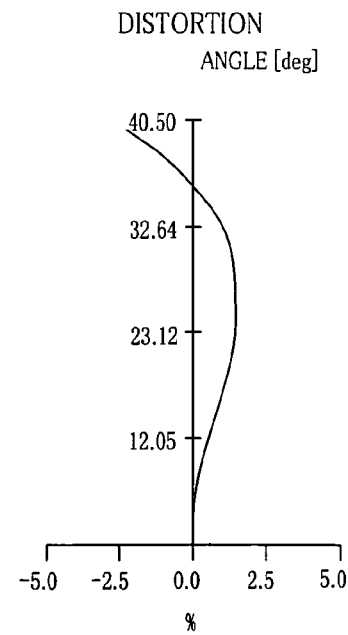

In FIGS. 26A, 26B and 26C, aberrations of the photographing lens 130 are depicted in graphs. Note that the aberrations are indicated with reference to the radius of curvature (−289 mm) obtained by conversion of a curved image surface (photo film surface) with respect to a diagonal direction, curving being at a radius of −200 mm in the horizontal direction.

Figure 27:
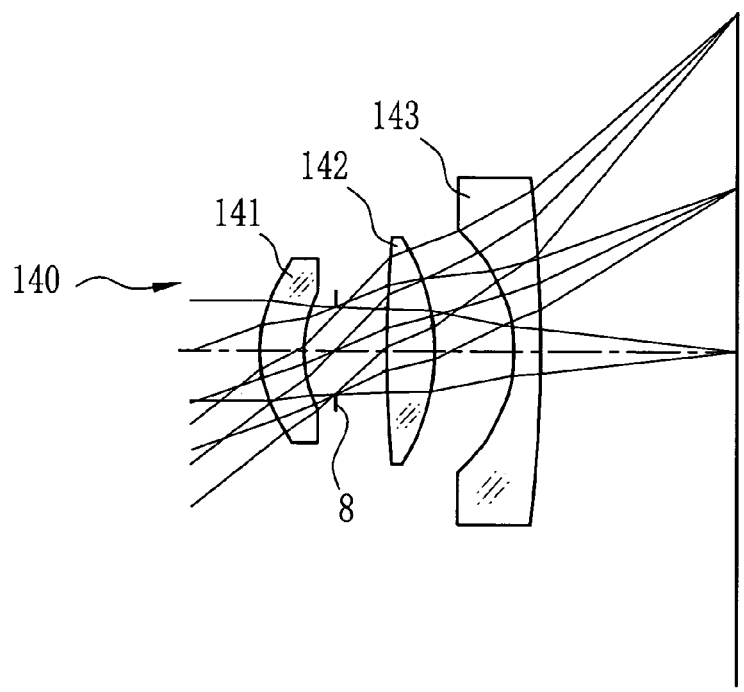

In FIG. 27, a 14th preferred photographing lens 140 of a three-element set includes first, second and third lens elements 141, 142 and 143 arranged in a direction away from the object side. The first lens element 141 has a positive power. The second lens element 142 has a positive power. The third lens element 143 has a negative power. The first lens element 141 is a positive meniscus, with a convex surface convex to the object side. The second lens element 142 is a double convex lens, of which a first convex surface directed to the object side has smaller convexity than that of a second convex surface directed to the image side. The third lens element 143 is a negative meniscus, of which a concave surface is oriented to the object side. The first and third lens elements 141 and 143 are formed respectively from transparent resin for optical use. The second lens element 142 is formed from glass for optical use. An aperture stop plate is disposed between the first and second lens elements 141 and 142. The convex surface of the first lens element 141 directed to the object side, and the concave surface of the third lens element 143 directed to the object side are aspherical. TABLE 14 indicates lens data and aspherical coefficients of the photographing lens 140.

TABLE 14, NO. 1

| Surface No. | Radius of curvature | Interval | Refractive index | Abbe No. |
| --- | --- | --- | --- | --- |
| 1 * | 8.492 | 2.70 | 1.492 | 57.5 |
| 2 | 10.250 | 1.86 | | |
| Aperture stop | Infinity | 3.19 | | |
| 4 | 122.923 | 2.91 | 1.720 | 50.3 |
| 5 | −14.522 | 4.84 | | |
| 6 * | −10.861 | 1.60 | 1.492 | 57.5 |
| 7 | −93.217 | 12.08 | | |

TABLE 14, NO. 2

| | 1st surface | 6th surface |
| --- | --- | --- |
| K | −0.46259 | −4.22607 |
| A | −7.41791E−5 | −5.52313E−4 |
| B | 2.94197E−6 | 6.67069E−6 |
| C | −1.99691E−7 | −8.19458E−8 |
| D | 3.10913E−10 | 4.70424E−10 |

Parameters of the photographing lens 140 are as follows.

F=26.00 mm

F1=66.81 mm

F2=18.20 mm

F3=−25.15 mm

F23=38.69 mm fno=4.03

2ω=81.0°

L=29.01 mm

Pz=−0.369 fb(30°)=0.025 mm.

According to those values, a ratio F2/F of F2 to F is $F2/F=(18.20/26.00)=0.70$

Conditions 1 and 2 and the Refraction Difference Condition are satisfied because of the values in TABLE 14, NO. 1:

|N1−N3|=|1.492−1.492|=0<0.13

|F2/F3|=|18.20/−25.15|=0.724

F23/F=(38.69/26)=1.49

Figure 28A:
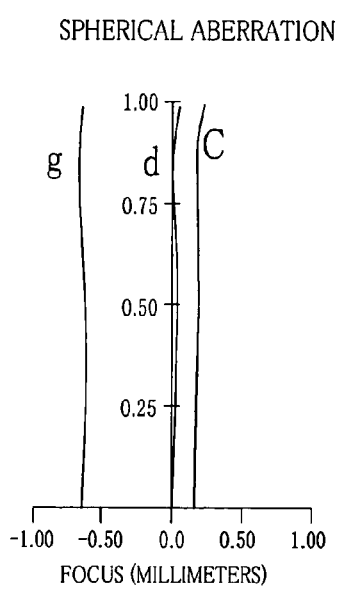
Figure 28B:
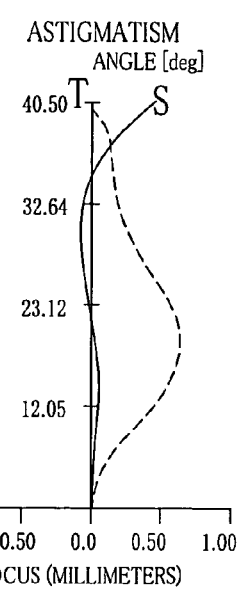
Figure 28C:
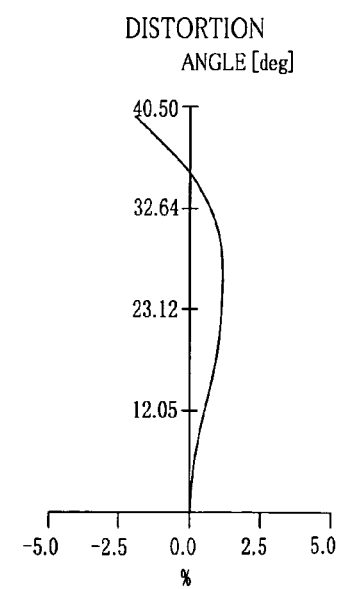

In FIGS. 28A, 28B and 28C, aberration of the photographing lens 140 is indicated in graphs. Note that in the present embodiment, the image surface is flat as a plane.

Figure 29:
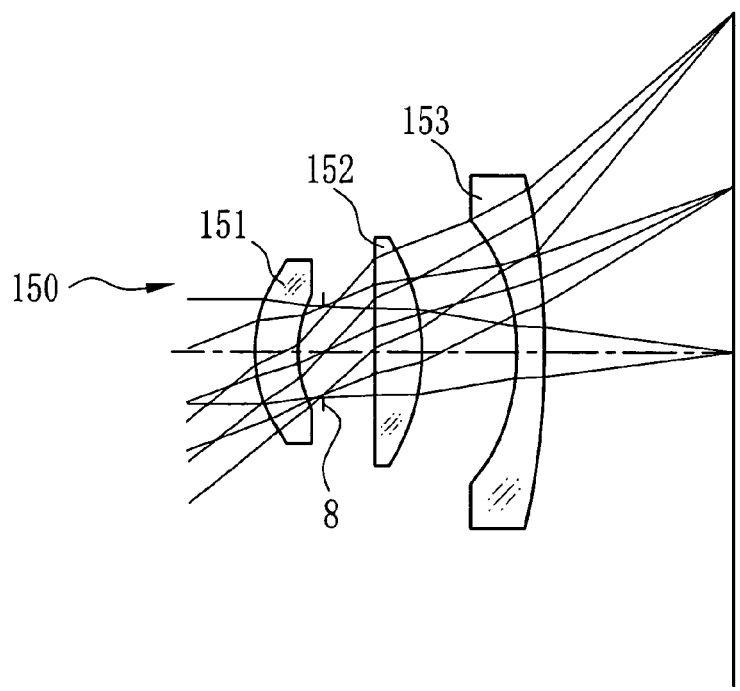

In FIG. 29, a 15$^{th}$ preferred photographing lens 150 includes first, second and third lens elements 151, 152 and 153 arranged in a direction away from the object side. The first lens element 151 has a positive power. The second lens element 152 has a positive power. The third lens element 153 has a negative power. The first lens element 151 is a positive meniscus, with a convex surface convex to the object side. The second lens element 152 is a double convex lens, of which a first convex surface directed to the object side has smaller convexity than that of a second convex surface directed to the image side. The third lens element 153 is a negative meniscus, of which a concave surface is oriented to the object side. In the photographing lens 150, the three lens elements 151, 152 and 153 are formed respectively from glass for optical use. An aperture stop plate is disposed between the first and second lens elements 151 and 152. The convex surface of the first lens element 151 directed to the object side, and the concave surface of the third lens element 153 directed to the object side are aspherical. TABLE 15 indicates lens data and aspherical coefficients of the photographing lens 150.

TABLE 15, NO. 1

| Surface No. | Radius of curvature | Interval | Refractive index | Abbe No. |
|---|---|---|---|---|
| 1 * | 8.439 | 2.70 | 1.620 | 60.3 |
| 2 | 8.883 | 1.66 | | |
| Aperture stop | Infinity | 3.00 | | |
| 4 | 1271.043 | 2.75 | 1.772 | 49.6 |
| 5 | −14.203 | 5.65 | | |
| 6 * | −41.766 | 1.60 | 1.720 | 50.3 |
| 7 | −56.918 | 11.92 | | |

TABLE 15, NO. 2

| | 1$^{st}$ surface | 6$^{th}$ surface |
|---|---|---|
| K | −0.556999 | −8.58759 |
| A | −2.78069E−5 | −4.04354E−4 |
| B | 2.61143E−6 | 5.38390E−6 |
| C | −1.75637E−7 | −5.42049E−8 |
| D | −1.93424E−10 | 2.51891E−10 |

Parameters of the photographing lens 150 are as follows.
F=26.00 mm
F1=81.81 mm
F2=18.20 mm
F3=−28.14 mm
F23=33.57 mm
fno=4.03
2ω=81.0°
L=29.11 mm
Pz=−0.38
fb(30°)=0.00 mm.
According to those values, a ratio F2/F of F2 to F is

F2/F=(18.20/26.00)=0.70

Conditions 1 and 2 and the Refraction Difference Condition are satisfied because of the values in TABLE 15, NO. 1:

|N1−N3|=|1.620−1.720|=0.1<0.13

|F2/F3|=|18.20/−28.14|=0.647

F23/F=(33.57/26)=1.29

Figure 30A:
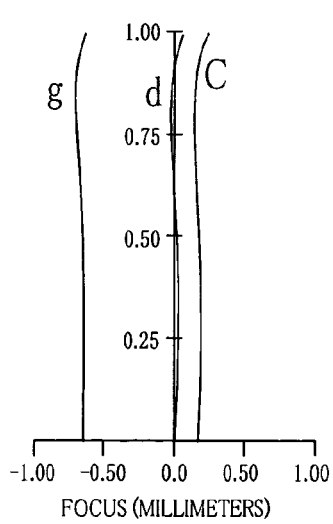
Figure 30B:
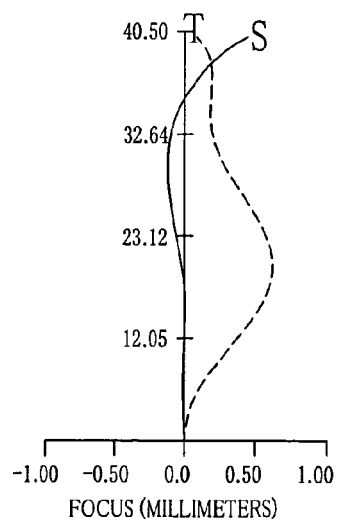
Figure 30C:
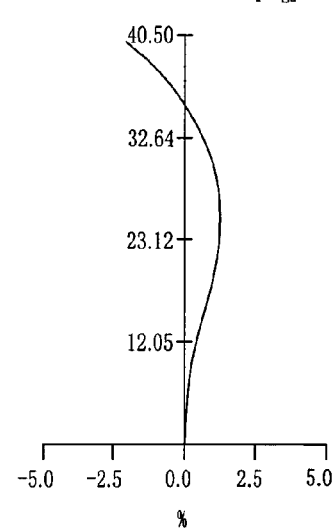

In FIGS. 30A, 30B and 30C, aberration of the photographing lens 150 is indicated in graphs.

FIGS. 31–50C illustrate other preferred embodiments of the invention, in which each of photographing lenses satisfies combined conditions of:

0.35<F2/F<0.7

The range defined in the condition according to the inequality makes it possible to reduce changes in the focus in response to changes in the environmental temperature due to typical characteristics of the resin.

Figure 31:
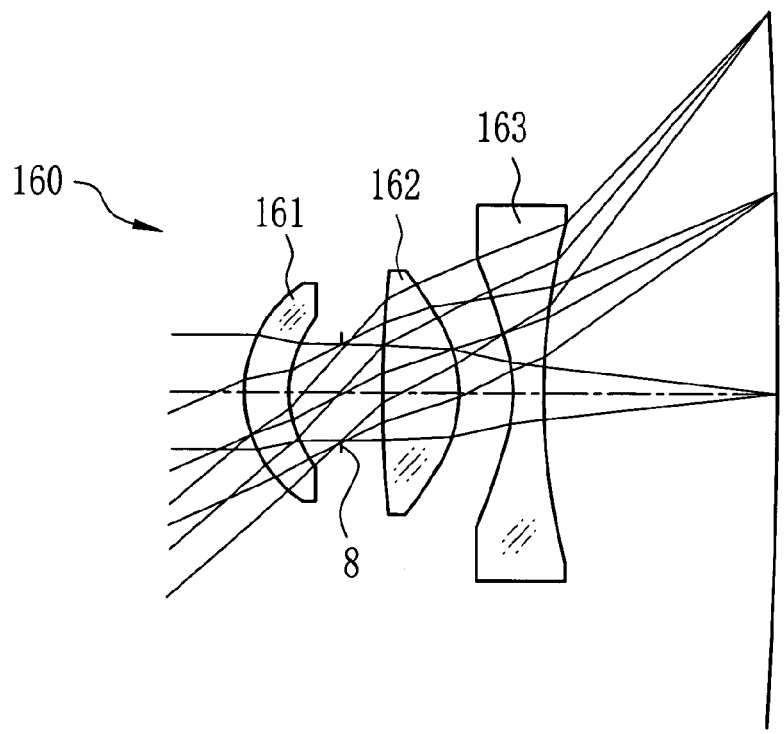

In FIG. 31, a 16$^{th}$ preferred photographing lens 160 of a three-element set includes first, second and third lens elements 161, 162 and 163 arranged in a direction away from the object side. The first lens element 161 has a positive power. The second lens element 162 has a positive power. The third lens element 163 has a negative power. The first lens element 161 is a positive meniscus, with a convex surface convex to the object side. The second lens element 162 is a double convex lens, of which a first convex surface directed to the image side (image surface side) has a smaller radius of curvature than that of a second convex surface directed to the object side. The third lens element 163 is a double concave lens, of which a first concave surface directed to the object side has a smaller radius of curvature than that of a second concave surface directed to the image side. The three lens elements 161, 162 and 163 are formed respectively from polymethyl methacrylate (PMMA) resin. An aperture stop plate or diaphragm 8 is disposed between the first and second lens elements 161 and 162. The concave surface of the first lens element 161 directed to the image side, and the convex surface of the second lens element 162 directed to the image side, and the concave surface of the third lens element 163 directed to the object side are aspherical. TABLE 16 indicates lens data and aspherical coefficients of the photographing lens 160.

TABLE 16, NO. 1

| Surface No. | Radius of curvature | Interval | Refractive index | Abbe No. | Material |
|---|---|---|---|---|---|
| 1 | 7.462 | 2.41 | 1.492 | 57.5 | Resin |
| 2 * | 8.067 | 2.71 | | | |
| Aperture stop | Infinity | 2.29 | | | |
| 4 | 68.231 | 4.25 | 1.492 | 57.5 | Resin |
| 5 * | −6.326 | 2.86 | | | |
| 6 * | −8.514 | 1.60 | 1.492 | 57.5 | Resin |
| 7 | 40.825 | | | | |

TABLE 16, NO. 2

| | 2$^{nd}$ surface | 5$^{th}$ surface | 6$^{th}$ surface |
|---|---|---|---|
| K | 0.54248 | −0.28132 | −0.05598 |
| A | 3.05867E−04 | 6.15839E−04 | 7.51297E−04 |
| B | 1.69311E−06 | 6.33051E−06 | 1.12307E−06 |
| C | −5.77160E−08 | −1.18394E−07 | −9.11494E−08 |
| D | 4.54106E−08 | 2.61302E−09 | 1.20825E−09 |

Parameters of the photographing lens 160 are as follows.
F=25.00 mm
F1=87.42 mm

F2=11.99 mm

F3=−14.17 mm

F23=31.1 mm fno=4.00

2ω=84.00°

L=28.93 mm

According to the values of F2 and F3, the following is obtained.

$|F2/F3|=|11.99/-14.17|=0.846$

Thus, Condition 1 is satisfied. Condition 2 is satisfied, because:

$F23/F=(31.1/25)=1.24$

The Refraction Difference Condition is satisfied, because:

$|N1-N3|=0<0.13$

Note that a ratio F2/F of F2 to F is $F2/F=(11.99/25)=0.480$

Figure 32A:
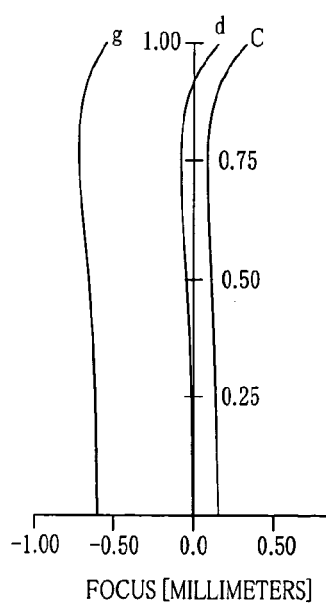
Figure 32B:
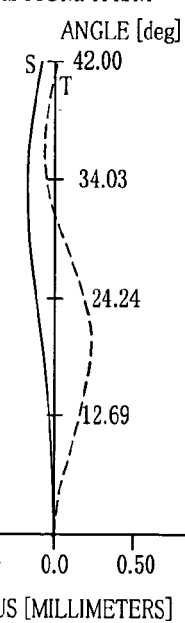
Figure 32C:
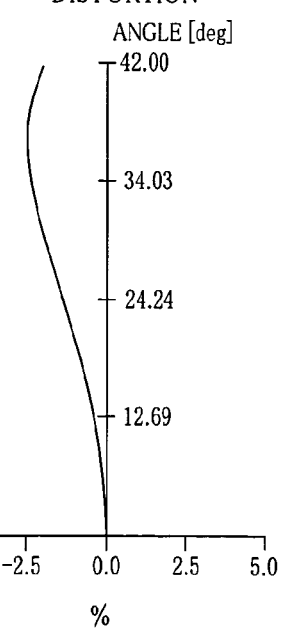

In FIGS. 32A, 32B and 32C, aberrations of the photographing lens 160 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 33:
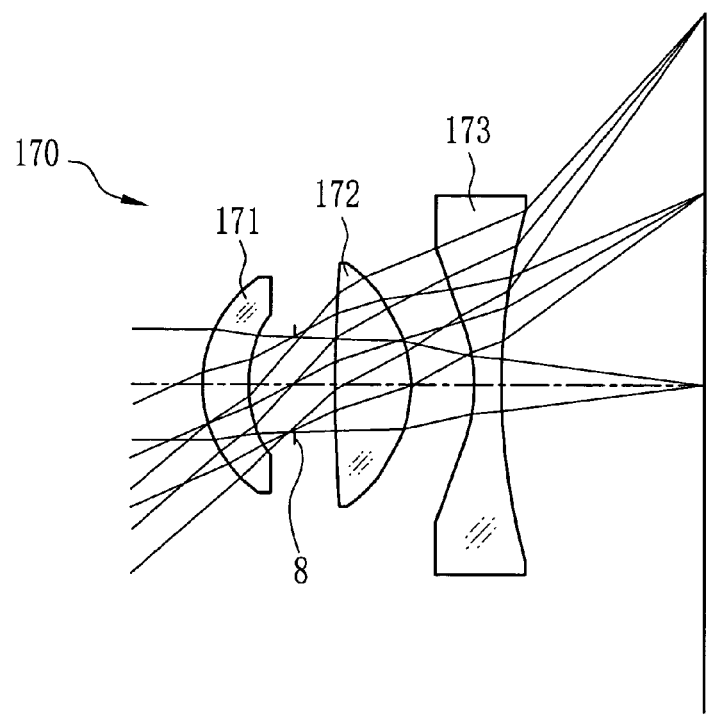

In FIG. 33, a 17$^{th}$ preferred photographing lens 170 of a three-element set includes first, second and third lens elements 171, 172 and 173 arranged in a direction away from the object side. The first lens element 171 has a positive power. The second lens element 172 has a positive power. The third lens element 173 has a negative power. The first lens element 171 is a positive meniscus, with a convex surface convex to the object side. The second lens element 172 is a double convex lens, of which a first convex surface directed to the image side has a smaller radius of curvature than that of a second convex surface directed to the object side. The third lens element 173 is a double concave lens, of which a first concave surface directed to the object side has a smaller radius of curvature than that of a second concave surface directed to the image side. The three lens elements 171, 172 and 173 are formed respectively from polymethyl methacrylate (PMMA) resin. An aperture stop plate is disposed between the first and second lens elements 171 and 172. The concave surface of the first lens element 171 directed to the image side, and the convex surface of the second lens element 172 directed to the image side, and the concave surface of the third lens element 173 directed to the object side are aspherical. TABLE 17 indicates lens data and aspherical coefficients of the photographing lens 170.

TABLE 17, NO. 1

| Surface No. | Radius of curvature | Interval | Refractive index | Abbe No. | Material |
|---|---|---|---|---|---|
| 1 | 7.658 | 2.65 | 1.492 | 57.5 | Resin |
| 2 * | 8.110 | 2.60 | | | |
| Aperture stop | Infinity | 2.40 | | | |
| 4 | 106.122 | 4.42 | 1.492 | 57.5 | Resin |
| 5 * | −6.255 | 3.58 | | | |
| 6 * | −8.214 | 1.60 | 1.492 | 57.5 | Resin |
| 7 | 40.858 | | | | |

TABLE 17, NO. 2

| | 2$^{nd}$ surface | 5$^{th}$ surface | 6$^{th}$ surface |
|---|---|---|---|
| K | 1.48366 | −0.22995 | −0.16496 |
| A | 1.09084E−04 | 5.74539E−04 | 7.39552E−04 |
| B | −1.56171E−06 | 7.88293E−06 | 1.14514E−06 |
| C | −3.66492E−07 | −1.50479E−07 | −8.09143E−08 |
| D | 3.92991E−08 | 4.13241E−09 | 1.02314E−09 |

Parameters of the photographing lens 170 are as follows.

F=25.00 mm

F1=95.28 mm

F2=12.16 mm

F3=−13.75 mm

F23=30.32 mm fno=4.00

2ω=84.00°

L=28.94 mm.

According to the values of F2 and F3, the following is obtained.

$|F2/F3|=|12.16/-13.75|=0.884$

Thus, Condition 1 is satisfied. Condition 2 is satisfied, because:

$F23/F=(30.32/25)=1.21$

The Refraction Difference Condition is satisfied, because:

$|N1-N3|=0<0.13$

Note that a ratio F2/F of F2 to F is $F2/F=(12.16/25)=0.486$

Figure 34A:
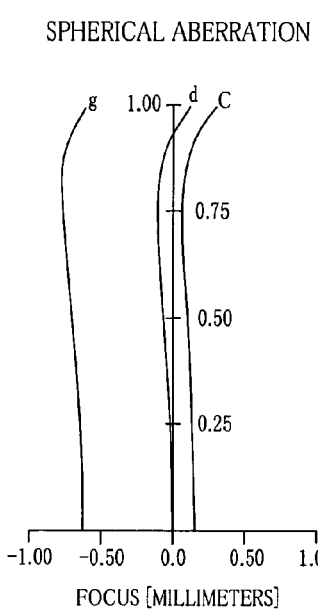
Figure 34B:
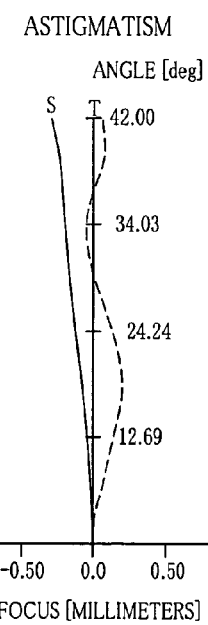
Figure 34C:
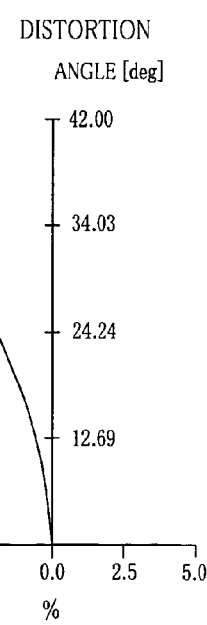

In FIGS. 34A, 34B and 34C, aberrations of the photographing lens 170 are depicted in graphs. Note that in the present embodiment, the image surface is flat as a plane.

Figure 35:
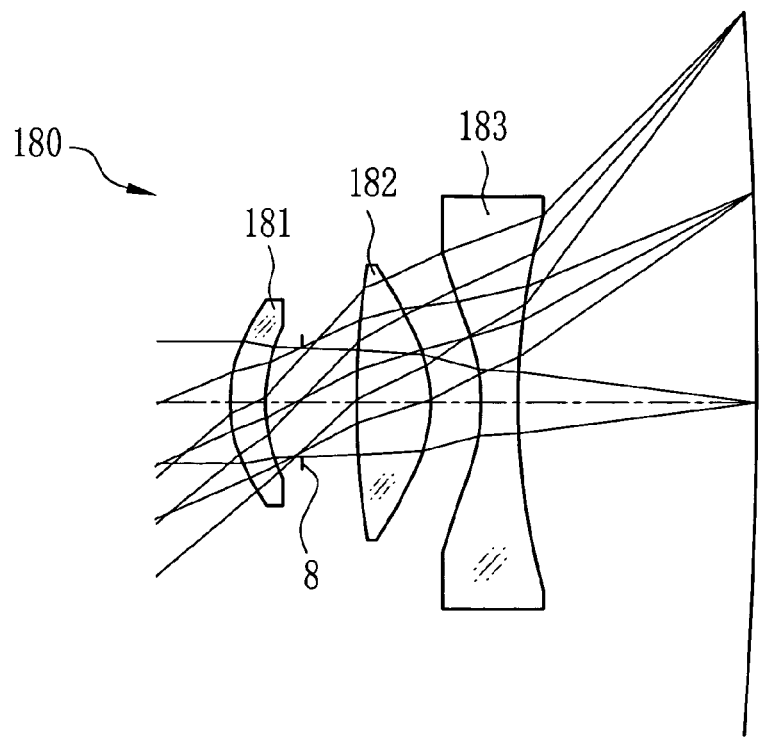

In FIG. 35, a 18$^{th}$ preferred photographing lens 180 of a three-element set includes first, second and third lens elements 181, 182 and 183 arranged in a direction away from the object side. The first lens element 181 has a positive power. The second lens element 182 has a positive power. The third lens element 183 has a negative power. The first lens element 181 is a positive meniscus, with a convex surface convex to the object side. The second lens element 182 is a double convex lens, of which a first convex surface directed to the image side has a smaller radius of curvature than that of a second convex surface directed to the object side. The third lens element 183 is a double concave lens, of which a first concave surface directed to the object side has a smaller radius of curvature than that of a second concave surface directed to the image side. The three lens elements 181, 182 and 183 are formed respectively from polymethyl methacrylate (PMMA) resin. An aperture stop plate is disposed between the first and second lens elements 181 and 182. The convex surface of the first lens element 181 directed to the object side, and the convex surface of the second lens element 182 directed to the image side, and the concave surface of the third lens element 183 directed to the object side are aspherical. TABLE 18 indicates lens data and aspherical coefficients of the photographing lens 180.

TABLE 18, NO. 1

| Surface No. | Radius of curvature | Interval | Refractive index | Abbe No. | Material |
|---|---|---|---|---|---|
| 1 * | 7.734 | 1.99 | 1.492 | 57.5 | Resin |

TABLE 18, NO. 1-continued

| Surface No. | Radius of curvature | Interval | Refractive index | Abbe No. | Material |
|---|---|---|---|---|---|
| 2 | 9.055 | 2.02 | | | |
| Aperture stop | Infinity | 3.06 | | | |
| 4 | 51.857 | 4.14 | 1.492 | 57.5 | Resin |
| 5 * | −6.840 | 2.81 | | | |
| 6 * | −8.153 | 2.00 | 1.492 | 57.5 | Resin |
| 7 | 43.221 | | | | |

TABLE 18, NO. 2

| | 1st surface | 5th surface | 6th surface |
|---|---|---|---|
| K | −0.48513 | −0.36938 | −0.28668 |
| A | −9.10794E−05 | 5.96004E−04 | 7.31662E−04 |
| B | 4.65296E−06 | 4.04318E−06 | −2.29029E−07 |
| C | −4.21207E−07 | −5.24697E−08 | −3.96760E−08 |
| D | 4.62382E−09 | 8.11129E−10 | 5.28700E−10 |

Parameters of the photographing lens 180 are as follows.
F=26.00 mm
F1=72.03 mm
F2=12.58 mm
F3=−13.76 mm
F23=38.2 mm
fno=4.00
2ω=83°
L=29.14 mm.

According to the values of F2 and F3, the following is obtained.

$|F2/F3|=|12.58/-13.76|=0.914$

Thus, Condition 1 is satisfied. Condition 2 is satisfied, because:

$F23/F=(38.2/26)=1.47$

The Refraction Difference Condition is satisfied, because:

$|N1-N3|=0<0.13$

Note that a ratio F2/F of F2 to F is $F2/F=(12.58/26)=0.484$

Figure 36A:
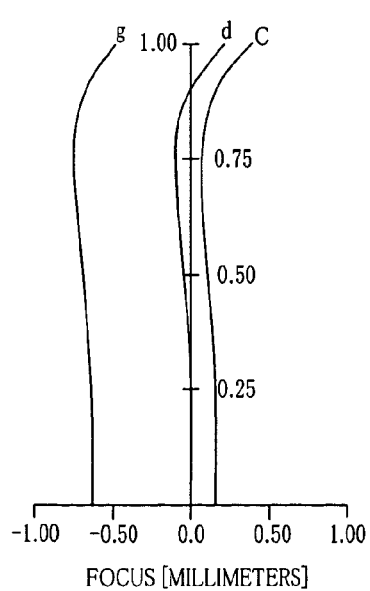
Figure 36B:
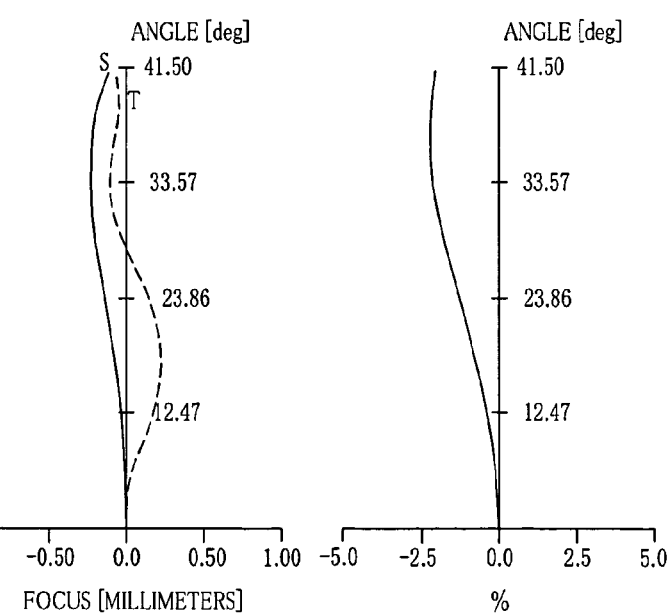
Figure 36C:
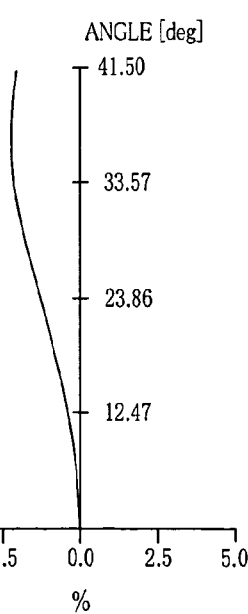

In FIGS. 36A, 36B and 36C, aberrations of the photographing lens 180 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 37:
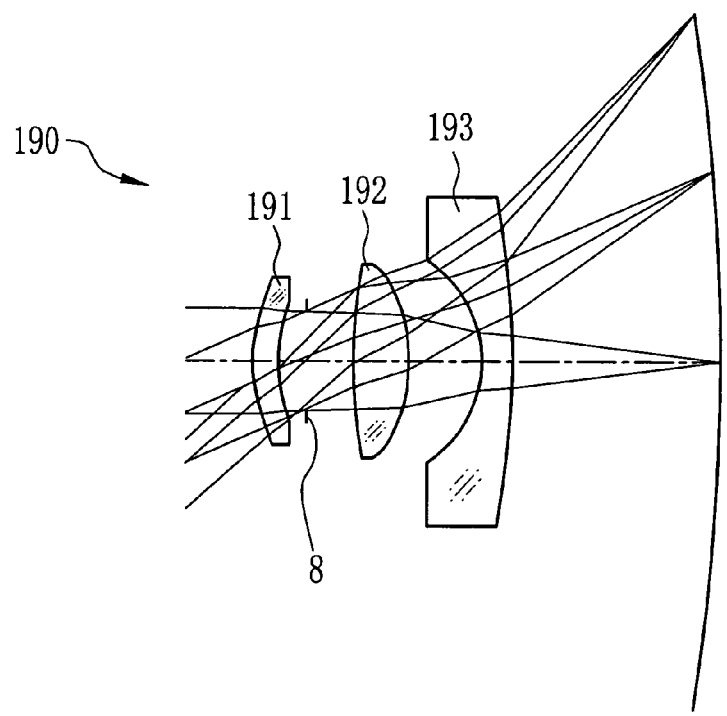

In FIG. 37, a 19th preferred photographing lens 190 of a three-element set includes first, second and third lens elements 191, 192 and 193 arranged in a direction away from the object side. The first lens element 191 has a positive power. The second lens element 192 has a positive power. The third lens element 193 has a negative power. The first lens element 191 is a positive meniscus, with a convex surface convex to the object side. The second lens element 192 is a double convex lens, of which a first convex surface directed to the image side has a smaller radius of curvature than that of a second convex surface directed to the object side. The third lens element 193 is a negative meniscus, of which a concave surface is oriented to the object side. The three lens elements 191, 192 and 193 are formed respectively from polymethyl methacrylate (PMMA) resin. An aperture stop plate is disposed between the first and second lens elements 191 and 192. The convex surface of the first lens element 191 directed to the object side, and the convex surface of the second lens element 192 directed to the image side, and the convex surface of the third lens element 193 directed to the image side are aspherical. TABLE 19 indicates lens data and aspherical coefficients of the photographing lens 190.

TABLE 19, NO. 1

| Surface No. | Radius of curvature | Interval | Refractive index | Abbe No. | Material |
|---|---|---|---|---|---|
| 1 * | 10.403 | 1.58 | 1.492 | 57.5 | Resin |
| 2 | 13.121 | 1.64 | | | |
| Aperture stop | Infinity | 2.86 | | | |
| 4 | 33.585 | 3.57 | 1.492 | 57.5 | Resin |
| 5 * | −9.762 | 4.55 | | | |
| 6 | −7.552 | 1.80 | 1.492 | 57.5 | Resin |
| 7 * | −39.671 | | | | |

TABLE 19, NO. 2

| | 1st surface | 5th surface | 7th surface |
|---|---|---|---|
| K | −0.28640 | 0.51976 | 10.38337 |
| A | −1.8592E−04 | 3.8014E−05 | 1.2059E−04 |
| B | −5.1408E−07 | 8.4662E−07 | −1.3401E−06 |
| C | −2.3526E−07 | −1.0219E−08 | 1.2102E−08 |
| D | 3.1365E−09 | 2.9832E−10 | −3.9493E−11 |

Parameters of the photographing lens 190 are as follows.
F=26.00 mm
F1=85.63 mm
F2=15.80 mm
F3=−19.32 mm
F23=36.64 mm
fno=4.00
2ω=85°
L=28.84 mm.

According to the values of F2 and F3, the following is obtained.

$|F2/F3|=|15.80/-19.32|=0.818$

Thus, Condition 1 is satisfied. Condition 2 is satisfied, because:

$F23/F=(36.64/26)=1.41$

The Refraction Difference Condition is satisfied, because:

$|N1-N3|=0<0.13$

Note that a ratio F2/F of F2 to F is $F2/F=(15.8/26)=0.608$

Figure 38A:
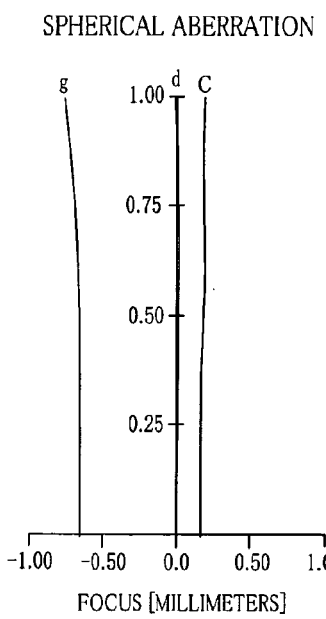
Figure 38B:
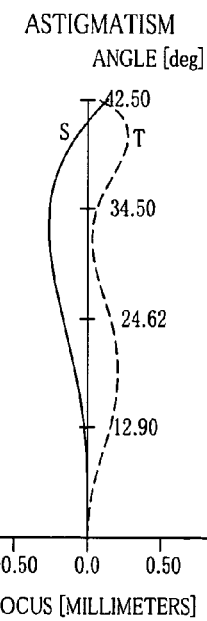
Figure 38C:
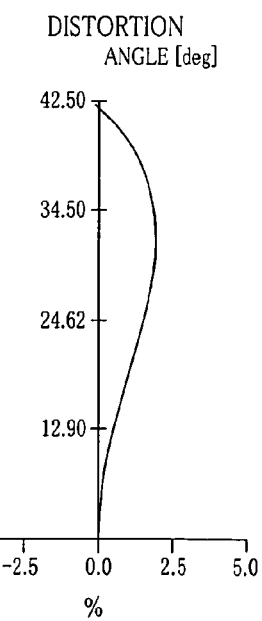

In FIGS. 38A, 38B and 38C, aberrations of the photographing lens 190 are depicted in graphs. Note that the aberrations are indicated with reference to the radius of curvature (−149 mm) obtained by conversion of a curved image surface (photo film surface) with respect to a diagonal direction, curving being at a radius of −100 mm in the horizontal direction.

Figure 39:
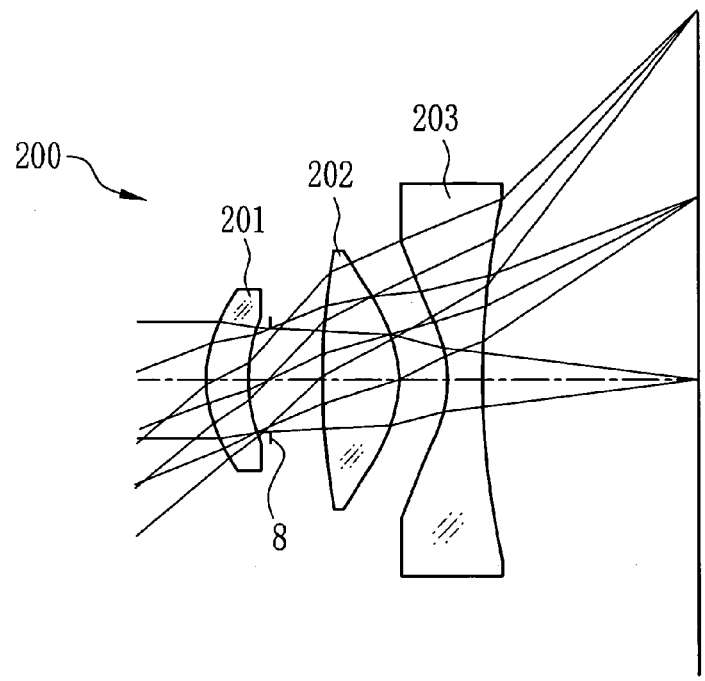

In FIG. 39, a 20th preferred photographing lens 200 of a three-element set includes first, second and third lens elements 201, 202 and 203 arranged in a direction away from the object side. The first lens element 201 has a positive power. The second lens element 202 has a positive power. The third lens element 203 has a negative power. The first lens element 201 is a positive meniscus, with a convex surface convex to the object side. The second lens element 202 is a double convex lens, of which a first convex surface directed to the image side has a smaller radius of curvature than that of a second convex surface directed to the object side. The third lens element 203 is a double concave lens, of which a first concave surface directed to the object side has a smaller radius of curvature than that of a second concave surface directed to the image side. The three lens elements 201, 202 and 203 are formed respectively from polymethyl methacrylate (PMMA) resin. An aperture stop plate is disposed between the first and second lens elements 201 and 202. The convex surface of the first lens element 201 directed to the object side, and the convex surface of the second lens element 202 directed to the image side, and the concave surface of the third lens element 203 directed to the object side are aspherical. TABLE 20 indicates lens data and aspherical coefficients of the photographing lens 200.

TABLE 20, NO. 1

| Surface No. | Radius of curvature | Interval | Refractive index | Abbe No. | Material |
|---|---|---|---|---|---|
| 1 * | 7.564 | 2.51 | 1.492 | 57.5 | Resin |
| 2 | 8.448 | 1.21 | | | |
| Aperture stop | Infinity | 3.02 | | | |
| 4 | 47.639 | 4.46 | 1.492 | 57.5 | Resin |
| 5 * | −6.320 | 2.80 | | | |
| 6 * | −6.919 | 2.00 | | | |
| 7 | 49.434 | | 1.492 | 57.5 | Resin |

TABLE 20, NO. 2

| | 1st surface | 5th surface | 6th surface |
|---|---|---|---|
| K | −0.52531 | −0.61470 | −0.48404 |
| A | −9.91863E−05 | 5.69094E−04 | 8.80102E−04 |
| B | 6.51121E−06 | 2.95307E−06 | −1.17835E−06 |
| C | −6.27405E−07 | −7.07377E−08 | −4.34869E−08 |
| D | 8.80060E−09 | 8.00919E−10 | 6.73893E−10 |

Parameters of the photographing lens 200 are as follows.
F=26.00 mm
F1=75.94 mm
F2=11.66 mm
F3=−12.19 mm
F23=36.83 mm
fno=4.00
2ω=81.4°
L=28.55 mm.

According to the values of F2 and F3, the following is obtained.

$|F2/F3|=|11.66/-12.19|=0.957$

Thus, Condition 1 is satisfied. Condition 2 is satisfied, because:

$F23/F=(36.83/26)=1.42$

The Refraction Difference Condition is satisfied, because:

$|N1-N3|=0<0.13$

Note that a ratio F2/F of F2 to F is $F2/F=(11.66/26)=0.448$

Figure 40A:
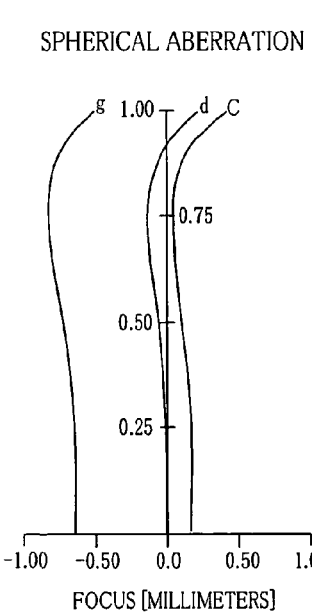
Figure 40B:
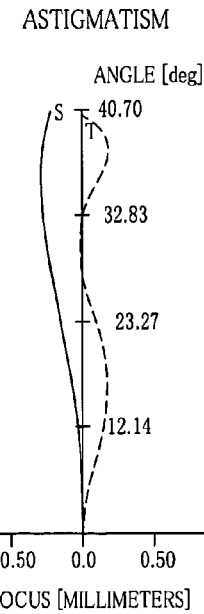
Figure 40C:
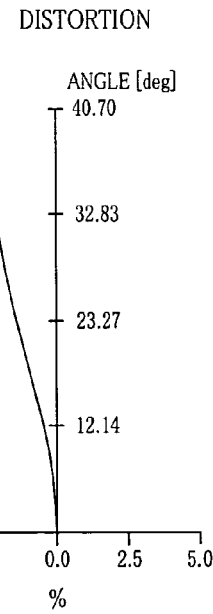

In FIGS. 40A, 40B and 40C, aberrations of the photographing lens 200 are depicted in graphs. Note that in the present embodiment, the image surface is flat as a plane.

Figure 41:
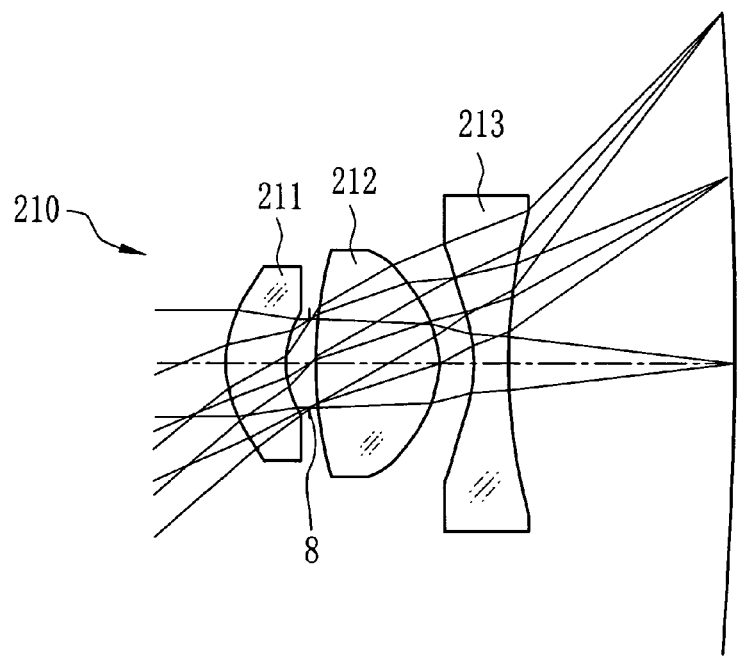

In FIG. 41, a 21st preferred photographing lens 210 of a three-element set includes first, second and third lens elements 211, 212 and 213 arranged in a direction away from the object side. The first lens element 211 has a positive power. The second lens element 212 has a positive power. The third lens element 213 has a negative power. The first lens element 211 is a positive meniscus, with a convex surface convex to the object side. The second lens element 212 is a double convex lens, of which a first convex surface directed to the image side has a smaller radius of curvature than that of a second convex surface directed to the object side. The third lens element 213 is a double concave lens, of which a first concave surface directed to the object side has a smaller radius of curvature than that of a second concave surface directed to the image side. The three lens elements 211, 212 and 213 are formed respectively from polymethyl methacrylate (PMMA) resin. An aperture stop plate is disposed between the first and second lens elements 211 and 212. The convex surface of the first lens element 211 directed to the object side, and the convex surface of the second lens element 212 directed to the image side, and the concave surface of the third lens element 213 directed to the object side are aspherical. TABLE 21 indicates lens data and aspherical coefficients of the photographing lens 210.

TABLE 21, NO. 1

| Surface No. | Radius of curvature | Interval | Refractive index | Abbe No. | Material |
|---|---|---|---|---|---|
| 1 * | 7.504 | 3.65 | 1.492 | 57.5 | Resin |
| 2 | 6.679 | 1.33 | | | |
| Aperture stop | Infinity | 0.42 | | | |
| 4 | 33.398 | 7.56 | 1.492 | 57.5 | Resin |
| 5 * | −5.339 | 2.04 | | | |
| 6 * | −7.062 | 2.00 | 1.492 | 57.5 | Resin |
| 7 | 39.001 | | | | |

TABLE 21, NO. 2

| | 1st surface | 5th surface | 6th surface |
|---|---|---|---|
| K | −0.54641 | −0.73833 | −0.38410 |
| A | −5.59191E−05 | 1.01408E−03 | 1.67494E−03 |
| B | 2.82869E−06 | −8.43128E−06 | −2.14893E−05 |
| C | −2.95206E−07 | −7.39282E−08 | 2.09229E−07 |
| D | 2.76936E−09 | −1.84385E−10 | −7.42296E−10 |

Parameters of the photographing lens 210 are as lows.
F=26.00 mm
F1=268.65 mm
F2=10.00 mm
F3=−11.98 mm
F23=24.12 mm
fno=4.00
2ω=83°
L=30.47 mm.

According to the values of F2 and F3, the following is obtained.

$|F2/F3|=|10.00/-11.98|=0.835$

Thus, Condition 1 is satisfied. Condition 2 is satisfied, because:

$F23/F=(24.12/26)=0.93$

The Refraction Difference Condition is satisfied, because:

$|N1-N3|=0<0.13$

Note that a ratio F2/F of F2 to F is $F2/F=(10.00/26)=0.385$

Figure 42A:
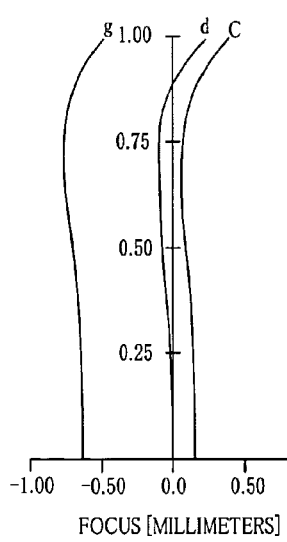
Figure 42B:
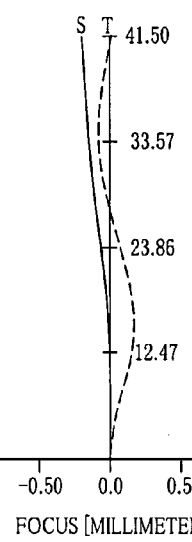
Figure 42C:
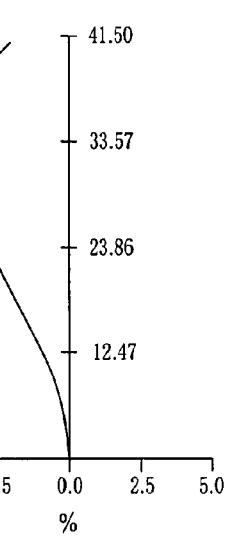

In FIGS. 42A, 42B and 42C, aberrations of the photographing lens 210 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

In FIG. 43, a 22$^{nd}$ preferred photographing lens 220 of a three-element set includes first, second and third lens elements 221, 222 and 223 arranged in a direction away from the object side. The first lens element 221 has a positive power. The second lens element 222 has a positive power. The third lens element 223 has a negative power. The first lens element 221 is a positive meniscus, with a convex surface convex to the object side. The second lens element 222 is a double convex lens, of which a first convex surface directed to the image side has a smaller radius of curvature than that of a second convex surface directed to the object side. The third lens element 223 is a double concave lens, of which a first concave surface directed to the object side has a smaller radius of curvature than that of a second concave surface directed to the image side. The three lens elements 221, 222 and 223 are formed respectively from polymethyl methacrylate (PMMA) resin. An aperture stop plate is disposed between the first and second lens elements 221 and 222. The convex surface of the first lens element 221 directed to the object side, and the convex surface of the second lens element 222 directed to the image side, and the concave surface of the third lens element 223 directed to the object side are aspherical. TABLE 22 indicates lens data and aspherical coefficients of the photographing lens 220.

TABLE 22, NO. 1

| Surface No. | Radius of curvature | Interval | Refractive index | Abbe No. | Material |
|---|---|---|---|---|---|
| 1 * | 8.467 | 2.16 | 1.492 | 57.5 | Resin |
| 2 | 9.984 | 1.59 | | | |
| Aperture stop | Infinity | 3.00 | | | |
| 4 | 32.769 | 4.71 | 1.492 | 57.5 | Resin |
| 5 * | −8.301 | 3.74 | | | |
| 6 * | −7.585 | 1.70 | 1.492 | 57.5 | Resin |
| 7 | 510.664 | | | | |

TABLE 22, NO. 2

| | 1$^{st}$ surface | 5$^{th}$ surface | 6$^{th}$ surface |
|---|---|---|---|
| K | −0.01337 | 0.00000 | −1.14036 |
| A | −2.25363E−04 | 2.54474E−04 | −1.01397E−04 |
| B | 4.76856E−06 | 9.46543E−07 | 3.12760E−06 |
| C | −4.86722E−07 | 3.10749E−08 | −8.63365E−08 |
| D | 5.65252E−09 | 0.00000 | 5.98031E−10 |

Parameters of the photographing lens 220 are as follows.

F=26.00 mm
F1=77.12 mm
F2=13.99 mm
F3=−15.17 mm
fno=4.03
2ω=82°
L=28.92 mm.

According to the values of F2 and F3, the following is obtained.

$|F2/F3|=|13.99/-15.17|=0.922$

Thus, Condition 1 is satisfied. Condition 2 is satisfied, because:

$F23/F=(37.88/26)=1.46$

The Refraction Difference Condition is satisfied, because:

$|N1-N3|=0<0.13$

Note that a ratio F2/F of F2 to F is $F2/F=(13.99/26)=0.608$

In FIGS. 44A, 44B and 44C, aberrations of the photographing lens 220 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 45:
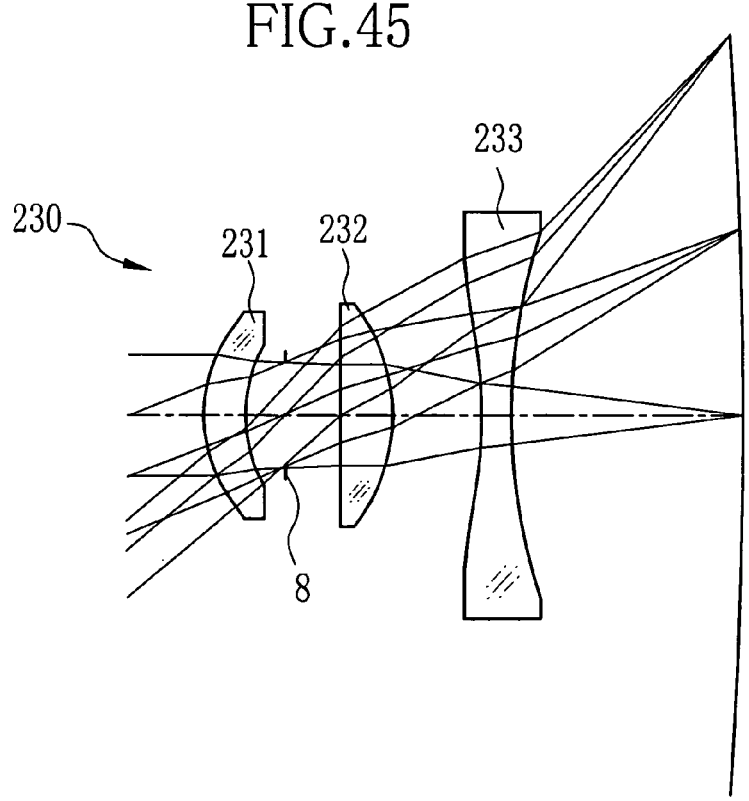

In FIG. 45, a 23$^{rd}$ preferred photographing lens 230 of a three-element set includes first, second and third lens elements 231, 232 and 233 arranged in a direction away from the object side. The first lens element 231 has a positive power. The second lens element 232 has a positive power. The third lens element 233 has a negative power. The first lens element 231 is a positive meniscus, with a convex surface convex to the object side. The second lens element 232 is a plano convex lens, with a convex surface convex to the image side, and with a flat surface oriented to the object side. The third lens element 233 is a double concave lens, of which a first concave surface directed to the object side has a smaller radius of curvature than that of a second concave surface directed to the image side. The three lens elements 231, 232 and 233 are formed respectively from polymethyl methacrylate (PMMA) resin. An aperture stop plate is disposed between the first and second lens elements 231 and 232. The convex surface of the first lens element 231 directed to the object side, and the convex surface of the second lens element 232 directed to the image side, and the concave surface of the third lens element 233 directed to the object side are aspherical. TABLE 23 indicates lens data and aspherical coefficients of the photographing lens 230.

TABLE 23, NO. 1

| Surface No. | Radius of curvature | Interval | Refractive index | Abbe No. | Material |
|---|---|---|---|---|---|
| 1 * | 7.416 | 2.25 | 1.492 | 57.5 | Resin |
| 2 | 7.999 | 2.17 | | | |
| Aperture stop | Infinity | 3.00 | | | |
| 4 | Flat | 2.93 | 1.492 | 57.5 | Resin |
| 5 * | −8.381 | 4.80 | | | |
| 6 * | −18.574 | 1.70 | 1.492 | 57.5 | Resin |
| 7 | 35.969 | | | | |

TABLE 23, NO. 2

| | 1$^{st}$ surface | 5$^{th}$ surface | 6$^{th}$ surface |
|---|---|---|---|
| K | −0.137298 | −0.447648 | −1.04407 |
| A | −1.81546E−04 | 2.19958E−04 | 2.04183E−04 |
| B | 3.13616E−06 | −3.88999E−08 | 6.64471E−07 |
| C | −3.26680E−07 | 3.44795E−08 | −2.16711E−08 |
| D | 1.76654E−10 | −5.24999E−10 | 1.16418E−10 |

Parameters of the photographing lens 230 are as follows.

F=26.00 mm
F1=90.98 mm
F2=17.00 mm

F3=−24.64 mm

F23=32.66 mm fno=4.03

2ω=82°

L=29.46 mm.

According to the values of F2 and F3, the following is obtained.

$|F2/F3|=|17.00/-24.64|=0.690$

Thus, Condition 1 is satisfied. Condition 2 is satisfied, because:

$F23/F=(32.66/26)=1.26$

The Refraction Difference Condition is satisfied, because:

$|N1-N3|=0<0.13$

Note that a ratio F2/F of F2 to F is $F2/F=(17.00/26)=0.654$

Figure 46A:
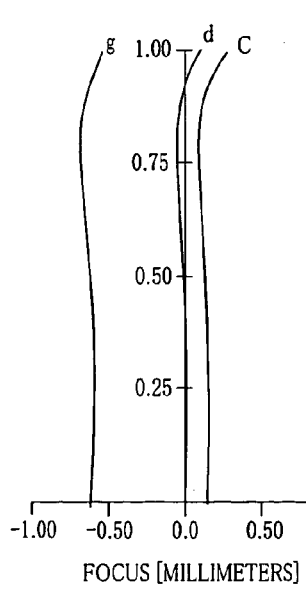
Figure 46B:
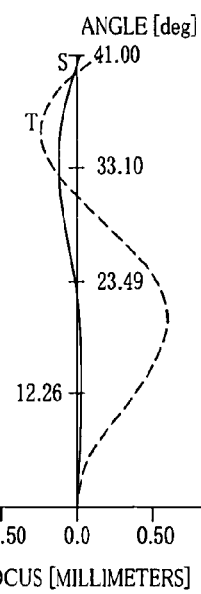
Figure 46C:
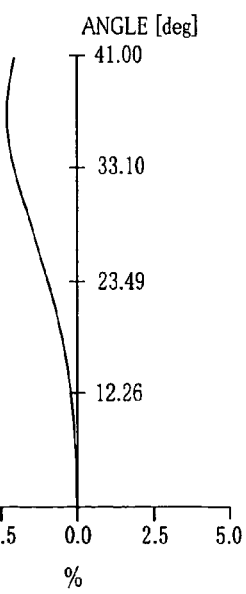

In FIGS. 46A, 46B and 46C, aberrations of the photographing lens 230 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 47:
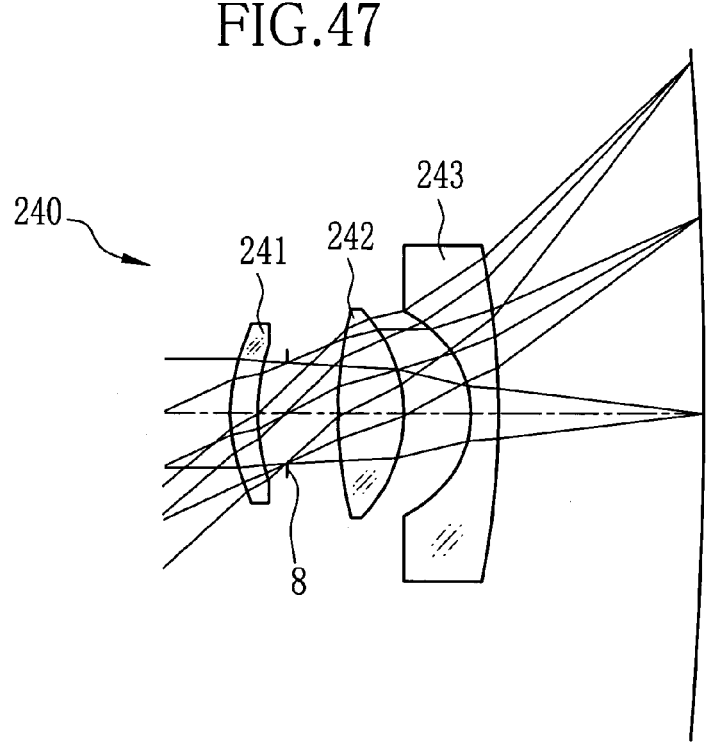

In FIG. 47, a 24$^{th}$ preferred photographing lens 240 of a three-element set includes first, second and third lens elements 241, 242 and 243 arranged in a direction away from the object side. The first lens element 241 has a positive power. The second lens element 242 has a positive power. The third lens element 243 has a negative power. The first lens element 241 is a positive meniscus, with a convex surface convex to the object side. The second lens element 242 is a double convex lens, of which a first convex surface directed to the image side has a smaller radius of curvature than that of a second convex surface directed to the object side. The third lens element 243 is a negative meniscus, of which a concave surface is oriented to the object side. The three lens elements 241, 242 and 243 are formed respectively from polymethyl methacrylate (PMMA) resin. An aperture stop plate is disposed between the first and second lens elements 241 and 242. The convex surface of the first lens element 241 directed to the object side, and the convex surface of the second lens element 242 directed to the object side, and the concave surface of the third lens element 243 directed to the object side are aspherical. TABLE 24 indicates lens data and aspherical coefficients of the photographing lens 240.

TABLE 24, NO. 1

| Surface No. | Radius of curvature | Interval | Refractive index | Abbe No. | Material |
|---|---|---|---|---|---|
| 1 * | 10.721 | 1.60 | 1.492 | 57.5 | Resin |
| 2 | 14.434 | 1.62 | | | |
| Aperture stop | Infinity | 3.09 | | | |
| 4 * | 29.024 | 3.95 | 1.492 | 57.5 | Resin |
| 5 | −9.123 | 4.14 | | | |
| 6 * | −6.561 | 1.60 | 1.492 | 57.5 | Resin |
| 7 | −50.976 | | | | |

TABLE 24, NO. 2

| | 1$^{st}$ surface | 4$^{th}$ surface | 6$^{th}$ surface |
|---|---|---|---|
| K | −0.469505 | −4.575959 | −0.336228 |
| A | −1.6295E−4 | 2.2192E−5 | −1.7623E−4 |
| B | −3.3173E−6 | 1.9360E−6 | −2.5179E−6 |
| C | −3.3109E−8 | −3.6932E−8 | −1.0720E−7 |
| D | −6.7807E−10 | 3.5578E−10 | −3.2110E−9 |

Parameters of the photographing lens 240 are as follows.

F=26.00 mm

F1=74.19 mm

F2=14.61 mm

F3=−15.49 mm

F23=41.01 mm fno=4.00

2ω=83°

L=28.38 mm.

According to the values of F2 and F3, the following is obtained.

$|F2/F3|=|14.61/-15.49|=0.943$

Thus, Condition 1 is satisfied. Condition 2 is satisfied, because:

$F23/F=(41.01/26)=1.58$

The Refraction Difference Condition is satisfied, because:

$|N1-N3|=0<0.13$

Note that a ratio F2/F of F2 to F is $F2/F=(14.61/26)=0.562$

Figure 48A:
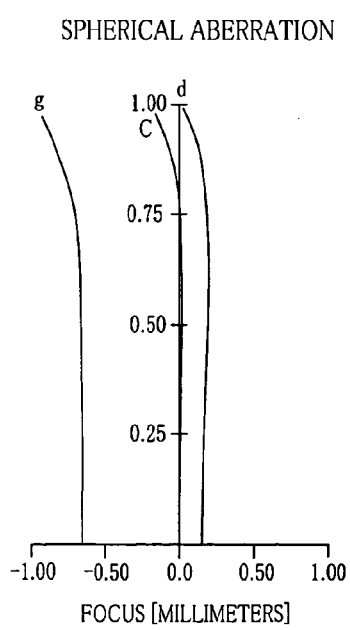
Figure 48B:
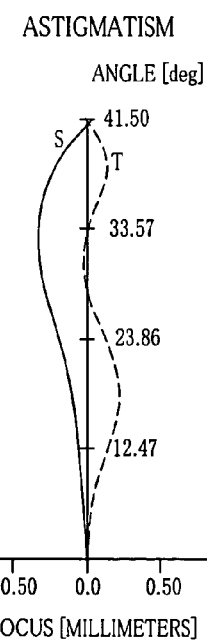
Figure 48C:
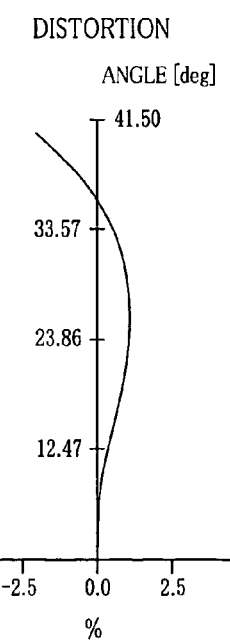

In FIGS. 48A, 48B and 48C, aberrations of the photographing lens 240 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 49:
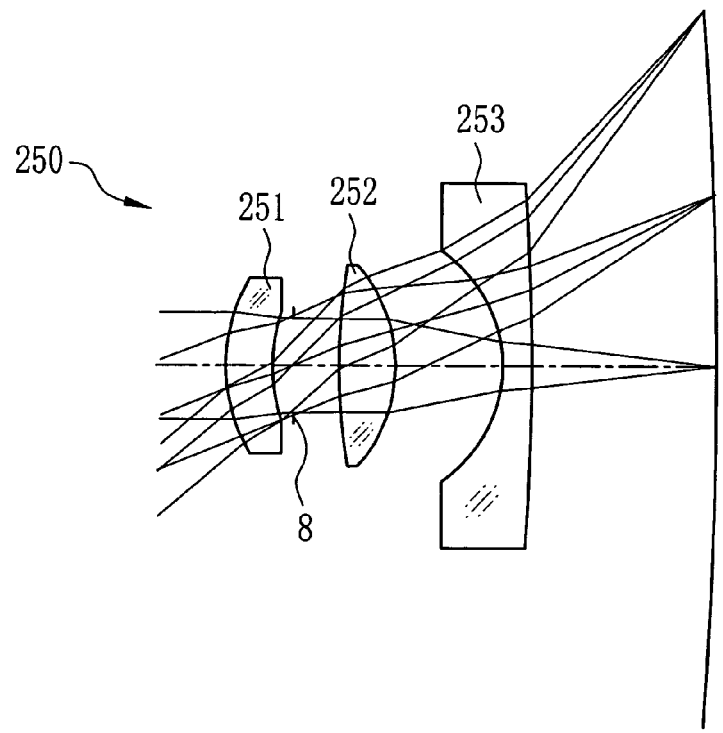

In FIG. 49, a 25$^{th}$ preferred photographing lens 250 of a three-element set includes first, second and third lens elements 251, 252 and 253 arranged in a direction away from the object side. The first lens element 251 has a positive power. The second lens element 252 has a positive power. The third lens element 253 has a negative power. The first lens element 251 is a positive meniscus, with a convex surface convex to the object side. The second lens element 252 is a double convex lens, of which a first convex surface directed to the image side has a smaller radius of curvature than that of a second convex surface directed to the object side. The third lens element 253 is a negative meniscus, of which a concave surface is oriented to the object side. The three lens elements 251, 252 and 253 are formed respectively from polymethyl methacrylate (PMMA) resin. An aperture stop plate is disposed between the first and second lens elements 251 and 252. The convex surface of the first lens element 251 directed to the object side, and the convex surface of the second lens element 252 directed to the image side are aspherical. TABLE 25 indicates lens data and aspherical coefficients of the photographing lens 250.

TABLE 25, NO. 1

| Surface No. | Radius of curvature | Interval | Refractive index | Abbe No. | Material |
|---|---|---|---|---|---|
| 1 * | 9.453 | 2.70 | 1.492 | 57.5 | Resin |
| 2 | 9.562 | 1.06 | | | |
| Aperture stop | Infinity | 2.86 | | | |
| 4 | 37.196 | 3.29 | 1.492 | 57.5 | Resin |
| 5 * | −9.148 | 6.15 | | | |
| 6 | −8.941 | 1.70 | 1.492 | 57.5 | Resin |
| 7 | −174.008 | | | | |

TABLE 25, NO. 2

| | 2nd surface | 5th surface |
|---|---|---|
| K | −0.25701 | 0.42839 |
| A | −2.0876E−4 | 1.4070E−4 |
| B | 1.9679E−6 | −3.0380E−6 |
| C | −4.3745E−7 | 1.4782E−7 |
| D | 6.0558E−9 | −1.3592E−9 |

Parameters of the photographing lens 250 are as follows:
F=26.00 mm
F1=183.89 mm
F2=15.28 mm
F3=−19.22 mm
F23=28.05 mm
fno=4.03
2ω=81°
L=28.66 mm.

According to the values of F2 and F3, the following is obtained.

$|F2/F3|=|15.28/-19.22"|=0.795$

Thus, Condition 1 is satisfied. Condition 2 is satisfied, because:

$F23/F=(28.05/26)=1.08$

The Refraction Difference Condition is satisfied, because:

$|N1-N3|=0<0.13$

Note that a ratio F2/F of F2 to F is $F2/F=(15.28/26)=0.588$

Figure 50A:
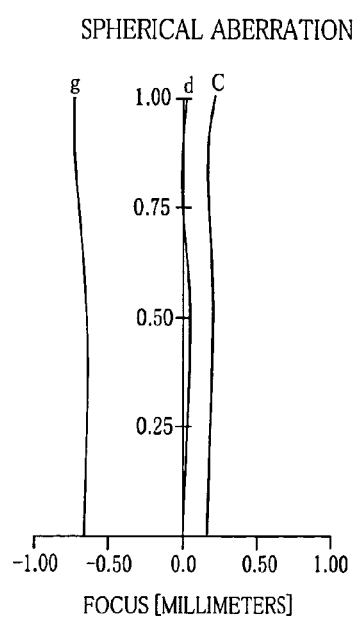
Figure 50B:
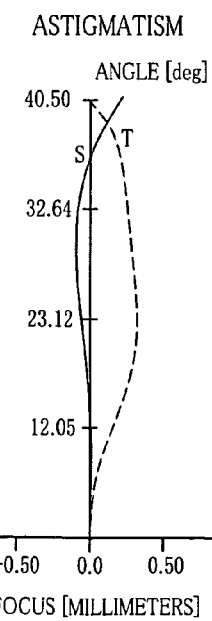
Figure 50C:
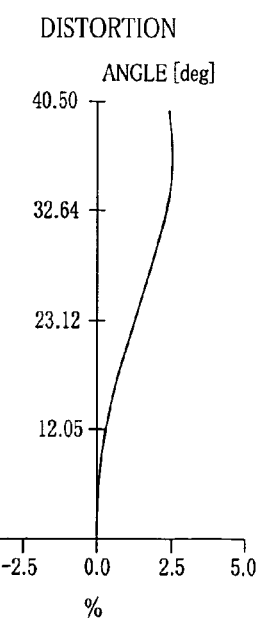

In FIGS. 50A, 50B and 50C, aberrations of the photographing lens 250 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 51:
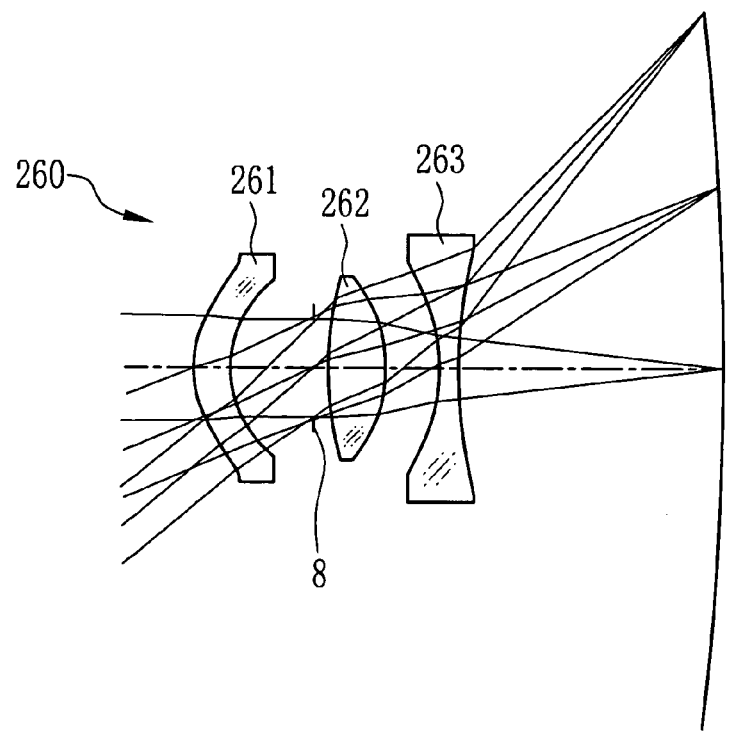

In FIG. 51, a 26th preferred photographing lens 260 of a three-element set includes first, second and third lens elements 261, 262 and 263 arranged in a direction away from the object side. The first lens element 261 has a positive power. The second lens element 262 has a positive power. The third lens element 263 has a negative power. The first lens element 261 is a positive meniscus, with a convex surface convex to the object side. The second lens element 262 is a double convex lens, of which a first convex surface directed to the image side has a smaller radius of curvature than that of a second convex surface directed to the object side. The third lens element 263 is a double concave lens, of which a first concave surface directed to the object side has a smaller radius of curvature than that of a second concave surface directed to the image side. The three lens elements 261, 262 and 263 are formed respectively from polymethyl methacrylate (PMMA) resin. An aperture stop plate is disposed between the first and second lens elements 261 and 262. The convex surface of the first lens element 261 directed to the object side, and the convex surface of the second lens element 262 directed to the image side, and the concave surface of the third lens element 263 directed to the object side are aspherical. TABLE 26 indicates lens data and aspherical coefficients of the photographing lens 260.

TABLE 26, NO. 1

| Surface No. | Radius of curvature | Interval | Refractive index | Abbe No. | Material |
|---|---|---|---|---|---|
| 1 * | 7.348 | 2.10 | 1.492 | 57.5 | Resin |
| 2 | 6.890 | 4.65 | | | |
| Aperture stop | Infinity | 1.15 | | | |
| 4 | 21.597 | 3.36 | 1.492 | 57.5 | Resin |
| 5 * | −8.372 | 3.04 | | | |
| 6 * | −12.200 | 1.10 | 1.492 | 57.5 | Resin |
| 7 | 34.00 | | | | |

TABLE 26, NO. 2

| | 1st surface | 5th surface | 6th surface |
|---|---|---|---|
| K | −0.976901 | 0.344559 | 0 |
| A | 4.13216E−5 | 1.88697E−4 | 6.45237E−5 |
| B | 6.82838E−6 | 1.53655E−5 | 1.44284E−6 |
| C | −3.55802E−7 | −6.57532E−7 | −1.25841E−7 |
| D | 2.29282E−9 | 1.19414E−8 | 7.88178E−10 |

Parameters of the photographing lens 260 are as follows.
F=26.00 mm
F1=438.09 mm
F2=12.73 mm
F3=−18.11 mm
F23=24.9 mm
fno=4.00
2ω=82°
L=30.68 mm.

According to the values of F2 and F3, the following is obtained.

$|F2/F3|=|12.73/-18.11|=0.703$

Thus, Condition 1 is satisfied. Condition 2 is satisfied, because:

$F23/F=(24.9/26)=0.96$

The Refraction Difference Condition is satisfied, because:

$|N1-N3|=0<0.13$

Note that a ratio F2/F of F2 to F is $F2/F=(12.73/26)=0.49$

Figure 52A:
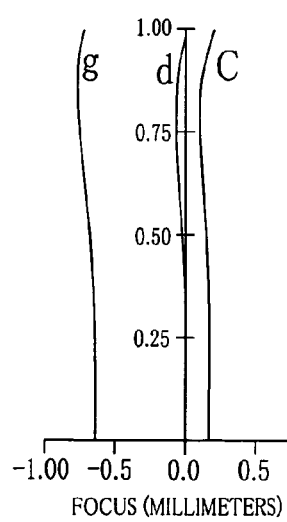
Figure 52B:
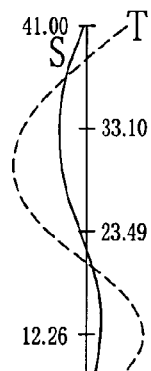
Figure 52C:
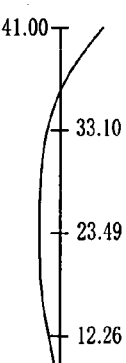

In FIGS. 52A, 52B and 52C, aberrations of the photographing lens 260 are depicted in graphs. Note that the aberrations are indicated with reference to the radius of curvature (−220 mm) obtained by conversion of a curved image surface (photo film surface) with respect to a diagonal direction, curving being at a radius of −150 mm in the horizontal direction.

In FIGS. 53–58C, each of the photographing lenses has a negative first lens element that is the nearest to the object side of the three lens elements.

In FIG. 53, a 27th preferred photographing lens 270 includes first, second and third lens elements 271, 272 and 273 arranged in a direction away from the object side. The first lens element 271 has a negative power. The second lens element 272 has a positive power. The third lens element 273 has a negative power. The first lens element 271 is a negative meniscus, of which a concave surface is oriented to the image side. The second lens element 272 is a double convex lens, of which a first convex surface directed to the image side has a smaller radius of curvature than that of a second convex surface directed to the object side. The third lens element 273 is a double concave lens, of which a first concave surface directed to the object side has a smaller radius of curvature than that of a second concave surface directed to the image side. The three lens elements 271, 272 and 273 are formed respectively from polymethyl methacrylate (PMMA) resin. An aperture stop plate is disposed between the first and second lens elements 271 and 272. The convex surface of the first lens element 271 directed to the object side, and the convex surface of the second lens element 272 directed to the image side, and the concave surface of the third lens element 273 directed to the object side are aspherical. TABLE 27 indicates lens data and aspherical coefficients of the photographing lens 270.

TABLE 27, NO. 1

| Surface No. | Radius of curvature | Interval | Refractive index | Abbe No. | Material |
|---|---|---|---|---|---|
| 1 * | 7.140 | 2.28 | 1.492 | 57.5 | Resin |
| 2 | 5.824 | 5.00 | | | |
| Aperture stop | Infinity | 0.64 | | | |
| 4 | 19.399 | 3.17 | 1.492 | 57.5 | Resin |
| 5 * | −8.165 | 3.74 | | | |
| 6 * | −12.023 | 1.10 | 1.492 | 57.5 | Resin |
| 7 | 43.786 | | | | |

TABLE 27, NO. 2

| | 1st surface | 5th surface | 6th surface |
|---|---|---|---|
| K | −0.939621 | 0.249646 | 0 |
| A | 8.25796E−5 | 7.78997E−5 | −6.09265E−5 |
| B | 2.72063E−6 | 1.18821E−5 | −4.81542E−6 |
| C | −2.26290E−7 | −5.98474E−7 | 8.15443E−8 |
| D | 1.14055E−10 | −1.09171E−8 | −3.61790E−9 |

Parameters of the photographing lens 270 are as follows.
F=26.00 mm
F1=−150.00 mm
F2=12.14 mm
F3=−19.05 mm
F23=20.17 mm
fno=4.00
2ω=81°
L=31.46 mm.

According to the values of F2 and F3, the following is obtained.

$|F2/F3|=|12.14/-19.05|=0.637$

Thus, Condition 1 is satisfied. Condition 2 is satisfied, because:

$F23/F=(20.17/26)=0.78$

The Refraction Difference Condition is satisfied, because:

$|N1-N3|=0<0.13$

Note that a ratio F2/F of F2 to F is $F2/F=(12.14/26)=0.47$

In FIGS. 54A, 54B and 54C, aberrations of the photographing lens 270 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 55:
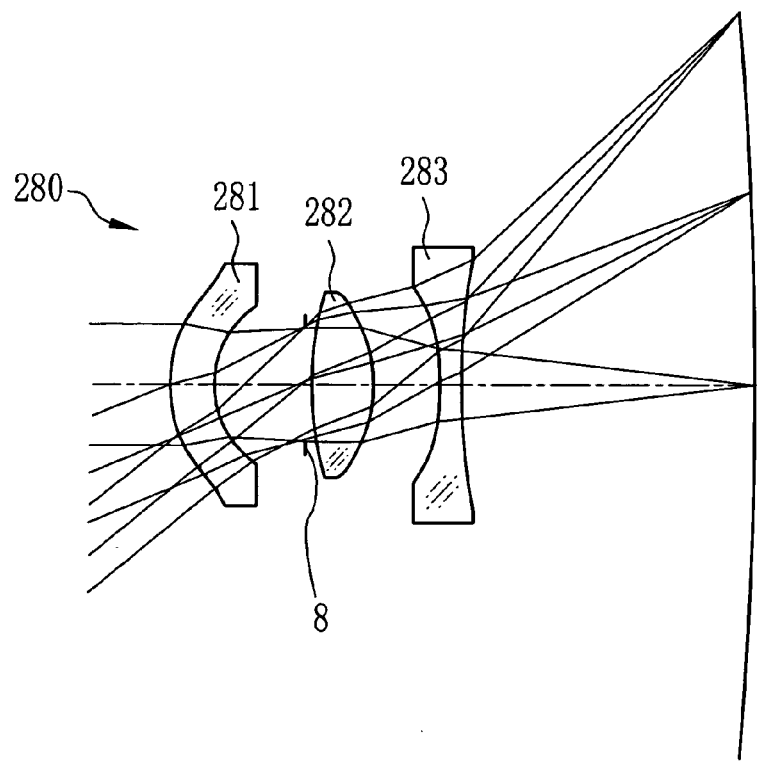

In FIG. 55, a 28th preferred photographing lens 280 includes first, second and third lens elements 281, 282 and 283 arranged in a direction away from the object side. The first lens element 281 has a negative power. The second lens element 282 has a positive power. The third lens element 283 has a negative power. The first lens element 281 is a negative meniscus, of which a concave surface is oriented to the image side. The second lens element 282 is a double convex lens, of which a first convex surface directed to the image side has a smaller radius of curvature than that of a second convex surface directed to the object side. The third lens element 283 is a double concave lens, of which a first concave surface directed to the object side has a smaller radius of curvature than that of a second concave surface directed to the image side. The three lens elements 281, 282 and 283 are formed respectively from polymethyl methacrylate (PMMA) resin. An aperture stop plate is disposed between the first and second lens elements 281 and 282. The convex surface of the first lens element 281 directed to the object side, and the convex surface of the second lens element 282 directed to the image side, and the concave surface of the third lens element 283 directed to the object side are aspherical. TABLE 28 indicates lens data and aspherical coefficients of the photographing lens 280.

TABLE 28, NO. 1

| Surface No. | Radius of curvature | Interval | Refractive index | Abbe No. | Material |
|---|---|---|---|---|---|
| 1 * | 6.945 | 2.40 | 1.942 | 57.5 | Resin |
| 2 | 5.393 | 5.00 | | | |
| Aperture Stop | Infinity | 0.43 | | | |
| 4 | 19.726 | 3.38 | 1.942 | 57.5 | Resin |
| 5 * | −7.945 | 3.74 | | | |
| 6 * | −13.032 | 1.10 | 1.942 | 57.5 | Resin |
| 7 | 44.240 | | | | |

TABLE 28, NO. 2

| | 1st surface | 5th surface | 6th surface |
|---|---|---|---|
| K | −0.90287 | 0.489654 | 0 |
| A | 9.45503E−5 | 1.07870E−4 | −1.11225E−4 |
| B | 3.87440E−6 | 1.38545E−5 | −3.69047E−6 |
| C | −2.23497E−7 | −6.42605E−7 | 2.35183E−8 |
| D | 2.42620E−10 | 1.52545E−8 | −2.63644E−9 |

Parameters of the photographing lens 280 are as follows.
F=26.00 mm
F1=−100.00 mm
F2=11.99 mm
F3=−20.33 mm
F23=18.87 mm
fno=4.00
2ω=81°
L=32.05 mm.

According to the values of F2 and F3, the following is obtained.

$|F2/F3|=|11.99/-20.33|=0.590$

Thus, Condition 1 is satisfied. Condition 2 is satisfied, because:

$F23/F=(18.87/26)=0.73$

The Refraction Difference Condition is satisfied, because:

$|N1-N3|=0<0.13$

Note that a ratio F2/F of F2 to F is $F2/F=(11.99/26)=0.46$

Figure 56A:
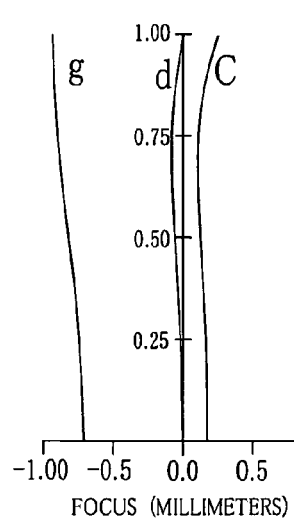
Figure 56B:
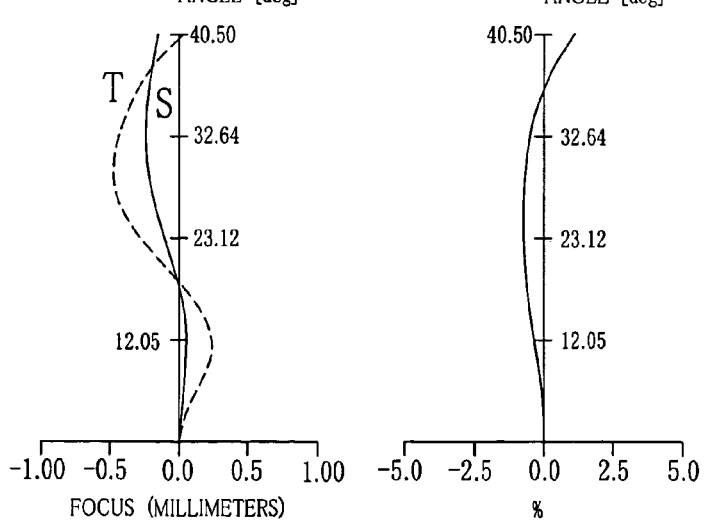
Figure 56C:
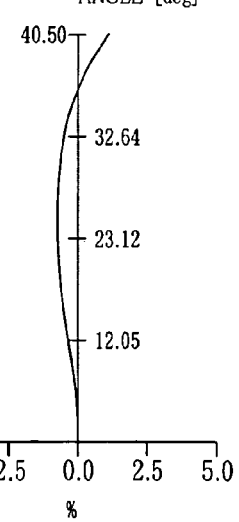

In FIGS. 56A, 56B and 56C, aberrations of the photographing lens 280 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

Figure 57:
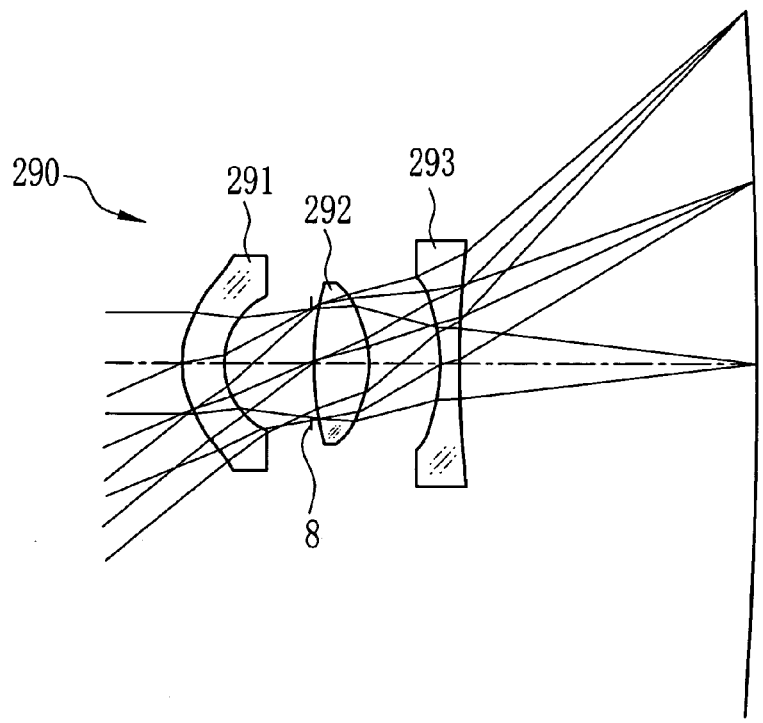

In FIG. 57, a 29$^{th}$ preferred photographing lens 290 includes first, second and third lens elements 291, 292 and 293 arranged in a direction away from the object side. The first lens element 291 has a negative power. The second lens element 292 has a positive power. The third lens element 293 has a negative power. The first lens element 291 is a negative meniscus, of which a concave surface is oriented to the image side. The second lens element 292 is a double convex lens, of which a first convex surface directed to the image side has a smaller radius of curvature than that of a second convex surface directed to the object side. The third lens element 293 is a double concave lens, of which a first concave surface directed to the object side has a smaller radius of curvature than that of a second concave surface directed to the image side. The three lens elements 291, 292 and 293 are formed respectively from polymethyl methacrylate (PMMA) resin. An aperture stop plate is disposed between the first and second lens elements 291 and 292. The convex surface of the first lens element 291 directed to the object side, and the convex surface of the second lens element 292 directed to the image side, and the concave surface of the third lens element 293 directed to the object side are aspherical. TABLE 29 indicates lens data and aspherical coefficients of the photographing lens 290.

TABLE 29, NO. 1

| Surface No. | Radius of curvature | Interval | Refractive index | Abbe No. | Material |
|---|---|---|---|---|---|
| 1 * | 6.948 | 2.40 | 1.492 | 57.5 | Resin |
| 2 | 4.800 | 5.00 | | | |
| Aperture stop | Infinity | 0.20 | | | |
| 4 | 19.625 | 3.23 | 1.492 | 57.5 | Resin |
| 5 * | −7.796 | 4.12 | | | |
| 6 * | −14.938 | 1.10 | 1.492 | 57.5 | Resin |
| 7 | 66.651 | | | | |

TABLE 29, NO. 2

| | 1$^{st}$ surface | 5$^{th}$ surface | 6$^{th}$ surface |
|---|---|---|---|
| K | −0.894414 | 0.782518 | 0 |
| A | 9.62921E-5 | 4.04754E-5 | −3.10442E-4 |
| B | 4.79008E-6 | 1.74561E-5 | −1.84120E-6 |
| C | −2.58861E-7 | −8.48157E-7 | −9.61226E-8 |
| D | 1.58814E-10 | 2.90057E-8 | −1.67866E-9 |

Parameters of the photographing lens 290 are as follows.
F=26.00 mm
F1=−50.00 mm
F2=11.80 mm
F3=−24.69 mm
F23=16.38 mm
fno=4.00
2ω=81°
L=33.55 mm.

According to the values of F2 and F3, the following is obtained.

$|F2/F3|=|11.80/-24.69|=0.478$

Thus, Condition 1 is satisfied. Condition 2 is satisfied, because:

$F23/F=(16.38/26)=0.63$

The Refraction Difference Condition is satisfied, because:

$|N1-N3|=0<0.13$

Note that a ratio F2/F of F2 to F is $F2/F=(11.80/26)=0.45$

Figure 58A:
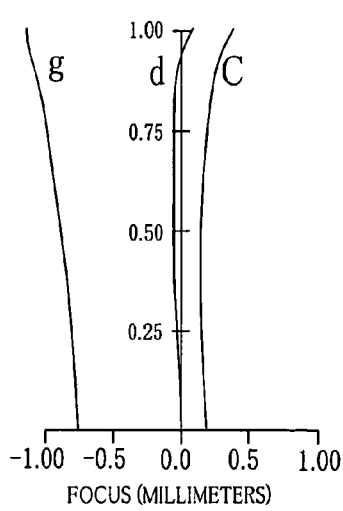
Figure 58B:
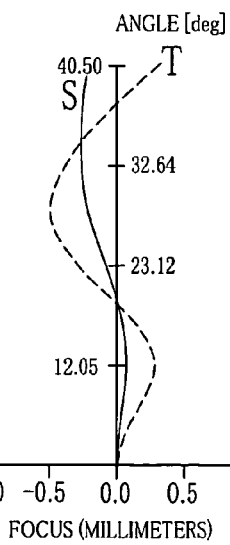
Figure 58C:
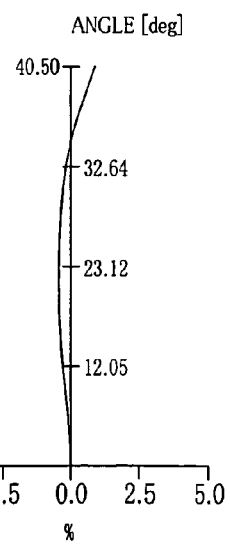

In FIGS. 58A, 58B and 58C, aberrations of the photographing lens 290 are depicted in graphs. Note that the aberrations are indicated with reference to the radius of curvature (−299 mm) obtained by conversion of a curved image surface (photo film surface) with respect to a diagonal direction, curving being at a radius of −200 mm in the horizontal direction.

The following is a list of combinations of the three lens elements according to each of the preferred embodiments.

| Embodiment No. | Lens element | | |
|---|---|---|---|
| | 1st | 2nd | 3rd |
| 1–4 and 7 | Positive meniscus | Positive meniscus | Negative meniscus |
| 5 | Double convex | Positive meniscus | Negative meniscus |
| 6 | Positive meniscus | Positive meniscus | Plano concave |
| 8, 10–15, 19, 24 and 25 | Positive meniscus | Double convex | Negative meniscus |
| 9 | Positive meniscus | Double convex | Plano concave |
| 16–18, 20–22 and 26 | Positive meniscus | Double convex | Double concave |
| 23 | Positive meniscus | Plano convex | Double concave |
| 27–29 | Negative meniscus | Double convex | Double concave |

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographing lens including first, second and third lens elements arranged in a sequence from an object side, comprising:
   said first lens element having a convex surface convex to said object side, at least one of surfaces of said first lens element being aspherical;

said second lens element having a positive power;
said third lens element having a concave surface oriented to said object side, and having a negative power;
wherein said first, second and third lens elements satisfy conditions of:

$$0.49<|F2/F3|<1.0, \text{ and}$$

$$0.5<F23/F<4$$

where F is a lens system composite focal length;
F2 is a focal length of said second lens element;
F3 is a focal length of said third lens element; and
F23 is a composite focal length of said second and third lens elements.

2. A photographing lens as defined in claim 1, wherein said second lens element is either a plano convex lens element convex to an image side, or a positive meniscus lens element convex to said image side, and further satisfies a condition of:

$$N1<N3$$

where N1 is a refractive index of said first lens element;
N3 is a refractive index of said third lens element.

3. A photographing lens as defined in claim 2, wherein said photographing lens further satisfies a condition of:

$$0.35<F2/F<0.9$$

4. A photographing lens as defined in claim 3, wherein at least one of surfaces of said third lens element is aspherical.

5. A photographing lens as defined in claim 4, wherein said first and third lens elements are formed respectively from resin, and said second lens element is formed from glass.

6. A photographing lens as defined in claim 5, wherein said first lens element has a power P1, and P1≧0.

7. A photographing lens as defined in claim 2, wherein said second lens element is either a double convex lens element having a first convex surface and a second convex surface convex to said image side and with a smaller radius of curvature than said first convex surface, or a plano convex lens element convex to said image side, and further satisfies a condition of:

$$|N1-N3|<0.13$$

where N1 is a refractive index of said first lens element; and
N3 is a refractive index of said third lens element.

8. A photographing lens as defined in claim 7, wherein at least one of surfaces of said third lens element is aspherical.

9. A photographing lens as defined in claim 8, wherein said photographing lens further satisfies a condition of:

$$0.35<F2/F<0.9$$

and said first lens element has a power P1, and P1≧0.

10. A photographing lens as defined in claim 7, wherein said first and third lens elements are formed respectively from glass.

11. A photographing lens as defined in claim 1, wherein said second lens element is a double convex lens element having a first convex surface and a second convex surface convex to said image side and with a smaller radius of curvature than said first convex surface, and said first, second and third lens elements are formed from one material.

12. A photographing lens as defined in claim 11, wherein at least one of surfaces of said second lens element is aspherical.

13. A photographing lens as defined in claim 1, wherein at least one of surfaces of said second lens element and at least one of surfaces of said third lens element are aspherical.

14. A photographing lens as defined in claim 1, wherein said first, second and third lens elements are formed respectively from glass.

15. A photographing lens as defined in claim 1, wherein said first, second and third lens elements are formed respectively from resin.

16. A photographing lens as defined in claim 15, wherein said resin comprises a methacrylate resin.

17. A photographing lens as defined in claim 1, wherein said convex surface of said first lens element directed to said object side, and a surface of said third lens element directed to an image side are aspherical.

18. A photographing lens as defined in claim 1, wherein said convex surface of said first lens element directed to said object side, and a surface of said second lens element directed to an image side are aspherical.

19. A photographing lens as defined in claim 1, wherein surfaces of said first and third lens elements directed to an image side are aspherical.

20. A photographing lens as defined in claim 1, wherein surfaces of said first and second lens elements directed to an image side are aspherical, and said concave surface of said third lens element directed to said object side is aspherical.

21. A photographing lens as defined in claim 1, wherein said convex surface of said first lens element directed to said object side, a surface of said second lens element directed to an image side, and said concave surface of said third lens element directed to said object side are aspherical.

22. A photographing lens as defined in claim 1, wherein said convex surface of said first lens element directed to said object side is aspherical, and surfaces of said second and third lens elements directed to an image side are aspherical.

23. A photographing lens as defined in claim 1, wherein surfaces of said first, second and third lens elements directed to said object side are aspherical.

* * * * *